United States Patent
Gilmore et al.

(10) Patent No.: US 9,007,621 B2
(45) Date of Patent: Apr. 14, 2015

(54) METHOD AND DEVICE FOR PRINTING A SCHEDULED PRINT JOB

(75) Inventors: Daren Gilmore, White Lake, MI (US); Kazutaka Oba, Johns Creek, GA (US); Jayasimha Nuggehalli, Cupertino, CA (US)

(73) Assignee: Ricoh Company, Ltd., Tokyo (JP)

(*) Notice: Subject to any disclaimer, the term of this patent is extended or adjusted under 35 U.S.C. 154(b) by 554 days.

(21) Appl. No.: 12/715,206

(22) Filed: Mar. 1, 2010

(65) Prior Publication Data
US 2011/0211218 A1    Sep. 1, 2011

(51) Int. Cl.
*G06F 3/12*   (2006.01)

(52) U.S. Cl.
CPC ............ *G06F 3/1285* (2013.01); *G06F 3/1207* (2013.01); *G06F 3/1259* (2013.01); *G06F 3/1267* (2013.01)

(58) Field of Classification Search
CPC ............................ G06F 3/1207; G06F 3/1259
USPC ............................................ 358/1.15, 1.1, 1.9
See application file for complete search history.

(56) References Cited

U.S. PATENT DOCUMENTS

| | | | | |
|---|---|---|---|---|
| 5,995,723 A | * | 11/1999 | Sperry et al. | 358/1.15 |
| 7,916,324 B2 | * | 3/2011 | Tanaka | 358/1.15 |
| 8,564,811 B2 | * | 10/2013 | Hanaoka et al. | 358/1.15 |
| 2004/0032619 A1 | * | 2/2004 | Izaki | 358/1.16 |
| 2005/0198347 A1 | * | 9/2005 | Wangoo et al. | 709/232 |
| 2005/0280861 A1 | * | 12/2005 | Shima et al. | 358/1.15 |
| 2006/0206894 A1 | * | 9/2006 | Jung et al. | 718/100 |
| 2006/0227368 A1 | * | 10/2006 | Hong | 358/1.15 |
| 2006/0244986 A1 | * | 11/2006 | Ferlitsch | 358/1.13 |
| 2007/0216959 A1 | * | 9/2007 | Yoshida et al. | 358/400 |
| 2008/0030772 A1 | * | 2/2008 | Shirai | 358/1.15 |
| 2008/0259399 A1 | * | 10/2008 | Wada | 358/1.15 |
| 2009/0009789 A1 | * | 1/2009 | Yoshida | 358/1.14 |
| 2010/0195141 A1 | * | 8/2010 | Fan et al. | 358/1.15 |

FOREIGN PATENT DOCUMENTS

JP          07152506 A   *   6/1995

* cited by examiner

*Primary Examiner* — King Poon
*Assistant Examiner* — Iriana Cruz
(74) *Attorney, Agent, or Firm* — Oblon, McClelland, Maier & Neustadt, L.L.P.

(57) ABSTRACT

A method and apparatus for outputting a scheduled print job by a printing device connected to a client device over a network. The method includes transmitting, by the client device, a request to print the scheduled print job to the printing device. The scheduled print job include print data and schedule data corresponding to a scheduled time the print data is to be printed. The printing device stores the received scheduled print job in memory, and executes the scheduled print job at the scheduled time. A determination is made as to whether the scheduled print job was outputted successfully at the scheduled time. Further, a message indicating whether the scheduled print job was outputted successfully, based on the determination, is sent to a predetermined device.

19 Claims, 26 Drawing Sheets

Fig. 9B

Scheduled Print Details

User ID: ▭ —962

Password: ▭ —964

Email Address: ▭ —968

Mobile Number: ▭ —970

Scheduled Date & Time

Date: ▭ —972

Time: ▭ —974

976—☐ Distribute   978— Details

OK   Cancel   Help

Scheduled Print Distribute Details

Printer 1: ▭ —982a
Printer 2: ▭ —982b
Printer 3: ▭ —982c
Printer 4: ▭ —982d
Printer 5: ▭ —982e Printer 6: ▭ —982f
Printer 7: ▭ —982g
Printer 8: ▭ —982h
Printer 9: ▭ —982i
Printer 10: ▭ —982j Note: Enter address (IP or hostname) of the printer OK   Cancel   Help

| PJL Command | Description |
|---|---|
| @PJL SCHEDULEJOB | |
| @PJL SET USERID="JOHN" | User ID |
| @PJL SET USERMAILID=JOHN@ACME.COM | Email address |
| @PJL SET JOBPASSWORD3="AUkxcAAARWFizJw" | Encrypted password |
| @PJL SET MOBILENUMBER="4085551212" | Mobile number for Text Message response |
| @PJL SET SCHEDILETIME=14:46:00" | Time at which job is scheduled |
| @PJL SET SCHEDULEDATE="2009/07/15" | Date at which job is scheduled |
| @PJL SET JOBDISTRIBUTEP1=172.30.2.112" | IP Address or hostname of printer to which job is distributed JOBDISTRIBUTEP1...JOBDISTRIBUTEP10 |
| @PJL SET JOBDISTRIBUTEP2="172.30.2.50" | |
| @PJL SET JOBDISTRIBUTEP10="172.30.2.64" | |

*Fig.10*

Scheduled Print

User ID: [_____] —1102

Password: [_____] —1104

| User ID | Job Name | Page | Date & Time | Exit |
|---|---|---|---|---|
| 1112a | ☐ Test Word Document | 2 | June 15 09:30:00 | |
| 1112b | ☐ Report Word Doc | 4 | June 10 08:30:00 | |
| 1112c | ☐ Spec Word Doc | 3 | June 02 08:30:00 | |
| 1112d | ☐ User Guide Doc | 7 | June 01 08:30:00 | |
| User ID: John | | | | |
| Total: 4 | | | | Delete —1118 |
| Next —1114 | | | | Edit —1120 |
| Previous —1116 | | | | Print —1122 |

| Job Name: Report Word Doc. | | Exit |
|---|---|---|

Date: ⬜—1132

Time: ⬜—1134

Job Distribution

Printer 1: ⬜—1136a  Printer 6: ⬜—1136f
Printer 2: ⬜—1136b  Printer 7: ⬜—1136g
Printer 3: ⬜—1136c  Printer 8: ⬜—1136h
Printer 4: ⬜—1136d  Printer 9: ⬜—1136i
Printer 5: ⬜—1136e  Printer 10: ⬜—1136j

1130

1138

Apply

*Fig. 11C*

| Scheduled Job Table ||
|---|---|
| PK | JobID |
| | UserID |
| | Password |
| | TimeStamp |
| | ScheduleTime |
| | ScheduleDate |
| | PageCount |
| | JobName |
| | EmailID |
| | MobileNumber |
| | PrinterAddress1 |
| | PrinterAddress1 |
| | PrinterAddress2 |
| | PrinterAddress3 |
| | PrinterAddress4 |
| | PrinterAddress5 |
| | PrinterAddress6 |
| | PrinterAddress7 |
| | PrinterAddress8 |
| | PrinterAddress9 |
| | PrinterAddress10 |

*Fig. 12A*

| Column Name | Description |
| --- | --- |
| Job ID | Unique Job Identifier (Primary Key) |
| User ID | User ID sent from driver |
| Password | Password sent from driver |
| TimeStamp | Time at which job is received |
| ScheduleTime | Time at which job is scheduled to print |
| ScheduleDate | Date on which job is scheduled to print |
| PageCount | Number of pages in job |
| JobName | Job name sent from driver |
| EmailID | Email ID sent from driver |
| MobileNumber | Mobile number sent from driver |
| PrinterAddress1<br><br>PrinterAddress10 | Information sent from driver if distribute option is selected and printer address is entered in the driver. |

Web API Response
```
<?xml version="1.0" encoding="ISO-8859-1" ?>
    <ScheduledPrintApiResponse>
        <command />
        <responseCode>1</responseCode>
        <message>UnknownCommand</message>
        <commandResponse />
</ScheduledPrintApiResponse>
```

*Fig. 18*

| Response Code | Description |
|---|---|
| 0 | Success |
| 1 | Unknown Command |
| 2 | Invalid Client ID |
| 3 | Missing Parameter |

*Fig. 19*

| Command | Response |
|---|---|
| scheduledjobs | <scheduledjob><br>  <deviceserialnumber>12345678</ deviceserialnumber><br>  <userID>ans</ userID><br>  <jobname>Ricoh Americas Corporation...</ jobname><br>  <pagecount>2</ pagecount><br>  <timestamp> Mon Jun 22 19:20:43 PDT 2009 </ timestamp><br>  <scheduledDate>Jun 22 2009</ scheduledDate><br>  <scheduledTime>19:20:43 PDT</ scheduledTime><br>  <emailID>user@acme.com </ emailID><br>  <mobileNumber>2226667777</ mobileNumber><br>  <printerAddress1>0.0.0.0</ printerAddress1><br>  <printerAddress2>0.0.0.0</ printerAddress1><br>  <printerAddress3>0.0.0.0</ printerAddress1><br>  <printerAddress4>0.0.0.0</ printerAddress1><br>  <printerAddress5>0.0.0.0</ printerAddress1><br>  <printerAddress6>0.0.0.0</ printerAddress1><br>  <printerAddress7>0.0.0.0</ printerAddress1><br>  <printerAddress8>0.0.0.0</ printerAddress1><br>  <printerAddress9>0.0.0.0</ printerAddress1><br>  <printerAddress10>0.0.0.0</ printerAddress1><br></ scheduledjob> |

*Fig. 20*

METHOD AND DEVICE FOR PRINTING A SCHEDULED PRINT JOB

BACKGROUND OF THE INVENTION

1. Field of the Invention

The present invention relates generally to printing a scheduled print job. The present invention is more particularly related to monitoring and managing outputting of the scheduled print job.

2. Description of the Related Art

In environments such as an office or computer lab, computers may be connected to one or more printing devices shared over a network. To print an electronic document, a computer user typically transmits a request to print the electronic document to one of the shared printing devices. The shared printing device prints the electronic document, in response to the print request, and the computer user retrieves the printed electronic document from the shared printing device.

However, in such environments, it is difficult to maintain confidentiality of the printed electronic document. For example, it is difficult to prevent other users from viewing the printed electronic document between the time the document is printed by the printing device and when the printed electronic document is retrieved by the computer user. Further, there is also the risk that another user may accidentally remove the printed electronic document when picking up their own printed electronic document.

Accordingly, a printing device may be configured to schedule printing of electronic documents. FIG. 1 illustrates an approach for scheduled printing of electronic documents, as disclosed in U.S. Patent Application Publication No. 2006/0227368, which is incorporated by reference in its entirety. As illustrated in FIG. 1, schedule data is generated in step S2. In step S4, a client sends an electronic document to the printing device. The printing device determines whether immediate or scheduled printing is to be used to print the electronic document, in step S6. Immediate printing is used if no schedule data is associated with the received electronic document, or if data indicates that immediate printing is used. In this situation, in step S8, the printing device immediately prints the electronic document. On the other hand, if scheduled printing is to be used, then the printing device stores the electronic document and prints the electronic document based on the schedule data, in step S10.

However, since the electronic document may be scheduled for printing at a later time and/or date, the user may forget to retrieve the printed electronic document at the scheduled time. The delayed printing may also make it difficult to confirm that necessary resources are available at the time of printing or to confirm that the electronic document was printed successfully. Further, the user may need to modify the scheduled printing of the electronic document based on a change of circumstances prior to the scheduled printing time.

SUMMARY OF THE INVENTION

According to an embodiment of the present invention, a method is provided for outputting a scheduled print job by a printing device connected to a client device over a network. The method includes transmitting, by the client device, a request to print the scheduled print job. The scheduled print job includes print data and schedule data. The schedule data corresponds to a scheduled time the print data is to be printed. Further, the request to print the scheduled print job is received by the printing device from the client device, and the scheduled print job is stored in a memory of the printing device. At the scheduled time, the scheduled print job is executed by the printing device. After the scheduled print job has been executed, the printing device determines whether the scheduled print job was outputted successfully. Based on the determination, the printing device sends a message indicating whether the scheduled print job was outputted successfully to a predetermined device.

Further, according to another embodiment of the present invention, there is provided a method of a printing device for outputting a scheduled print job. The method includes receiving, by the printing device, a request to print the scheduled print job. The scheduled print job includes print data and schedule data. The schedule data corresponds to a scheduled time the print data is to be printed. The scheduled print job is stored in a memory of the printing device. At the scheduled time, the scheduled print job is executed by the printing device. The printing device determines whether the scheduled print job was outputted successfully at the scheduled time, and sends a message indicating whether the scheduled print job was outputted successfully, based on the determination, to a predetermined device.

According to another embodiment of the invention, there is provided a printing device. The printing device includes means for receiving a request to print the scheduled print job, the scheduled print job including print data and schedule data corresponding to a scheduled time the print data is to be printed; a memory configured to store the scheduled print job; means for executing the scheduled print job at the scheduled time; means for determining whether the scheduled print job was outputted successfully at the scheduled time; and means for sending a message indicating whether the scheduled print job was outputted successfully, based on the determination by the means for determining, to a predetermined device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 9A-9D are screenshots of exemplary interfaces that may be used to request a scheduled print job using the client device;

FIG. 10 illustrates exemplary PJL commands/comments corresponding to the scheduled print job;

FIGS. 11A-11C are screenshots of exemplary interfaces that may be used to manage scheduled print jobs via the scheduled print device;

FIGS. 12A and 12B illustrate an exemplary scheduled print job database schema;

FIGS. 16A-16D are exemplary interfaces that may be used by an administrator to manage a scheduled print device through a web interface;

FIG. 18 illustrates an exemplary web service API response;

FIG. 19 illustrates exemplary web service API response codes; and

FIG. 20 illustrates exemplary data returned based on an API command request.

DETAILED DESCRIPTION OF THE PREFERRED EMBODIMENTS

Figure 1:
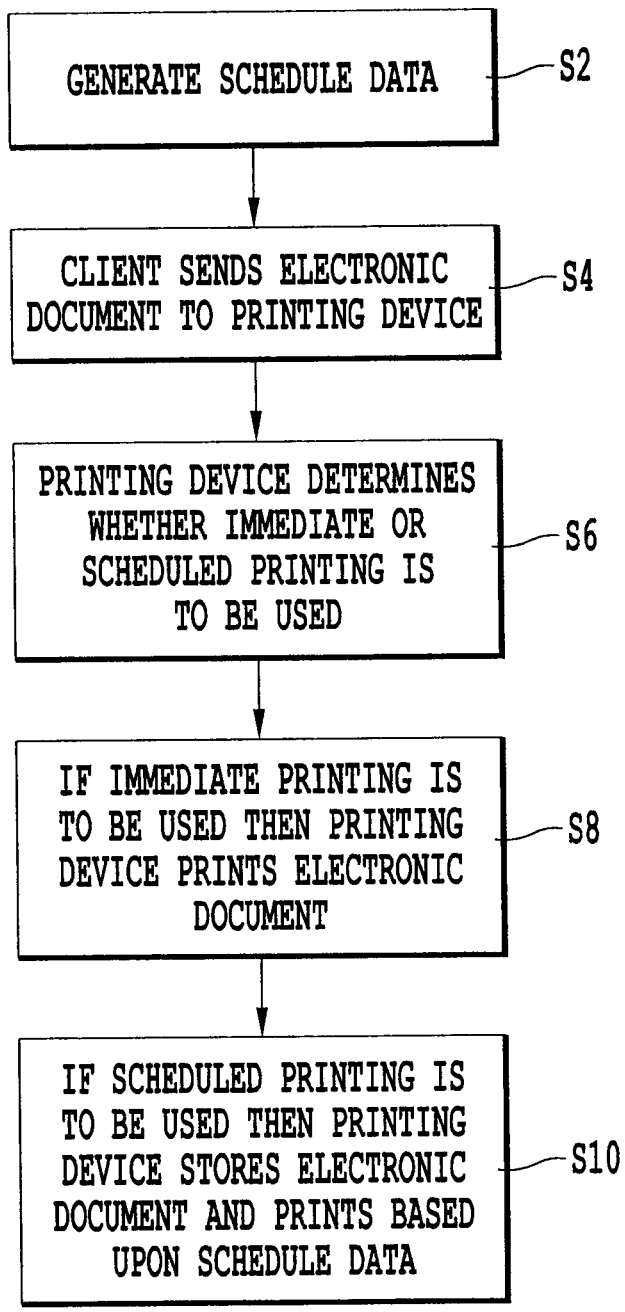
FIG. 1 illustrates an operational example of scheduled printing of electronic documents.
Figure 2:
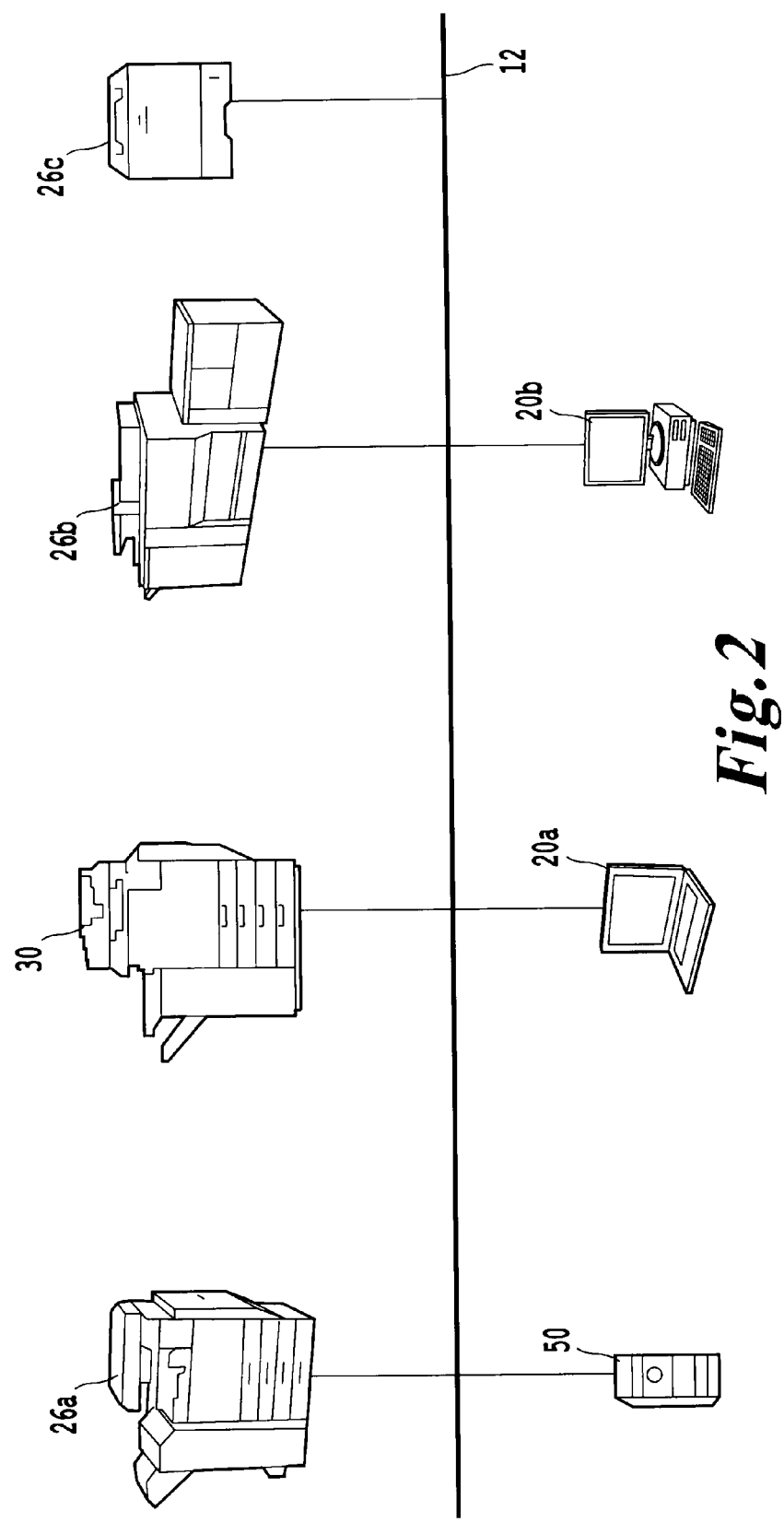
FIG. 2 illustrates an exemplary scheduled printing system including client devices, printing devices, and an e-mail server.

Referring now to the drawings, wherein like reference numerals designate identical or corresponding parts throughout the several views, FIG. 2 is a block diagram that shows an exemplary scheduled printing system including client devices 20a and 20b (e.g., a portable or desktop computer), printing devices (e.g., normal print devices 26a-26c and scheduled print device 30), and e-mail server 50 connected to each other over a network 12.

The scheduled print device 30 is a printing device on which a scheduled print application is deployed. Client devices 20a and 20b are used to submit print jobs of an immediate print type or a scheduled print type. When a client device 20 submits a scheduled print job, the print job is submitted along with scheduled print related commands and a time and/or date at which the print job is to be printed. Further, the e-mail server 50 allows the scheduled print device 30 to send print job status information back to a user via e-mail. As illustrated in FIG. 2, the scheduled printing system may include one or more normal print devices 26a-26c to which the print job can be distributed based on a command within the print job, or to which print jobs can be routed in case there is an error in the scheduled print device 30 while printing a scheduled print job.

Figure 3:
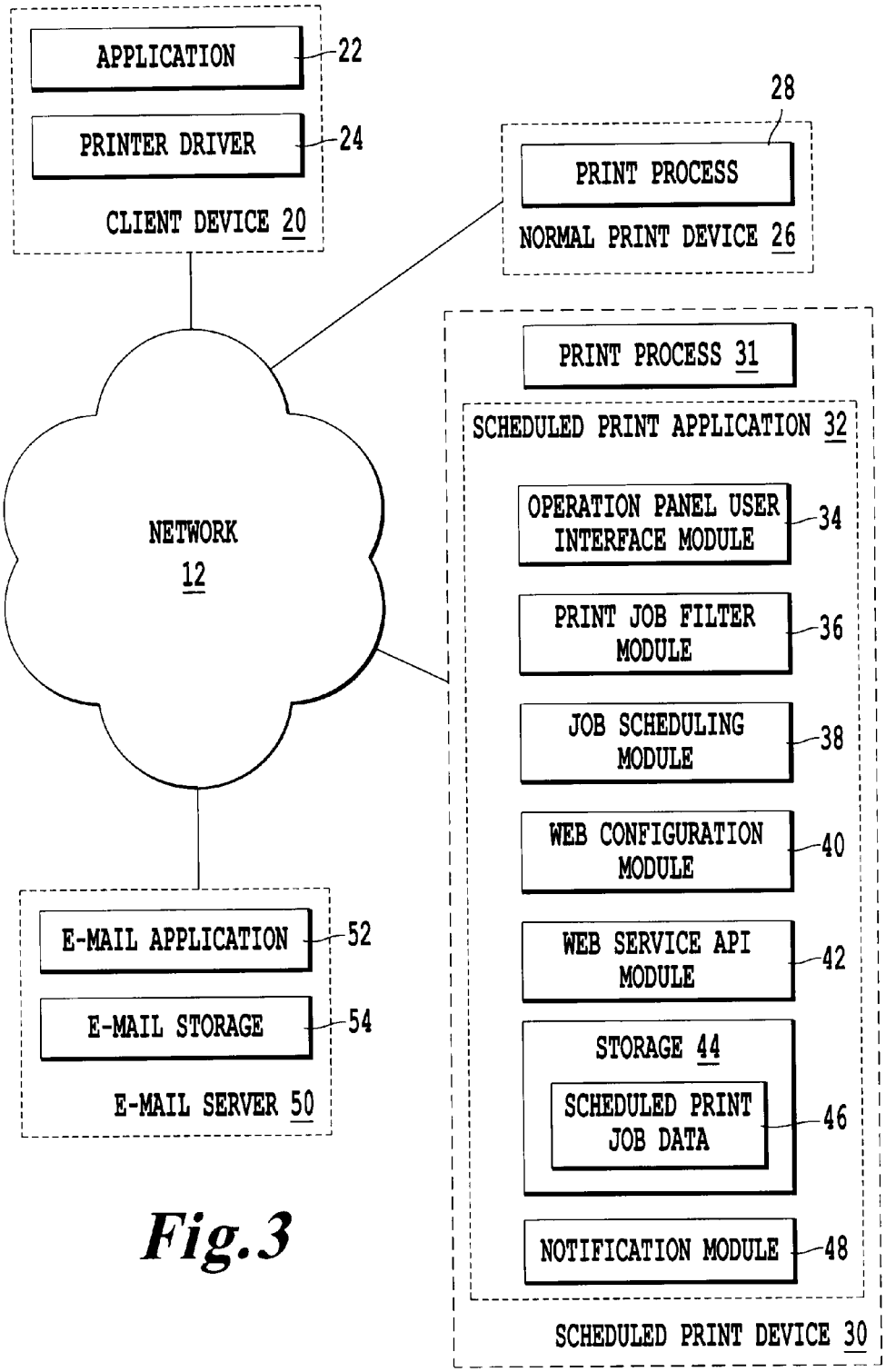
FIG. 3 illustrates the client device, the printing devices, and the e-mail server in further detail.

FIG. 3 illustrates an exemplary network structure including components of the client device 20, the normal print device 26, the scheduled print device 30, and the e-mail server 50. As illustrated in FIG. 3, the client device 20, the normal print device 26, the scheduled print device 30, and the e-mail server 50 are connected to each other over the network 12, such as a Local Area Network (LAN), Wide Area Network (WAN), or Wireless Local Area Network (WLAN). It is noted that the client device 20, the normal print device 26, the scheduled print device 30, and the e-mail server 50 need not be connected to each other over the same network, and may, for example, be connected to each other by any one or a combination of different communication paths (e.g., the Internet, a LAN, or mobile network).

The client device 20 may include an application 22 and a printer driver 24. Application 22 may be any type of application executed on the client device 20. The application 22 may include one or a combination of, for example, a word processing application, spreadsheet application, e-mail client, web browser, portable document format (PDF) viewer, image viewing/editing software, or any other application configured to generate data for processing by the scheduled print device 30. The printer driver 24 is configured to provide a user interface for a user to request printing of a print job, as further discussed below. The client device 20 may provide user interfaces such as those illustrated in FIGS. 9A-9D. The printer driver 24 is configured to process the data from the application 22 and generate print data, and/or schedule data, that is provided to the scheduled print device 30 for processing.

The normal print device 26 may include a print process 28. The print process 28 may be implemented by one or more processes for printing a print job received from the client device 20 or the scheduled print device 30.

The scheduled print device 30 includes a print process 31, which may be implemented by one or more processes for printing a print job received from the client device 20, and a scheduled print application 32. The scheduled print application 32 may include an operation panel user interface module 34, a print job filter module 36, a job scheduling module 38, a web configuration module 40, a web service API module 42, a storage 44 storing scheduled print job data 46, and a notification module 48. However, it is noted that one or more of the operation panel user interface module 34, the print job filter module 36, the job scheduling module 38, the web configuration module 40, the web service API module 42, the storage 44 storing scheduled print job data 46, and the notification module 48 may be provided separately from the scheduled print application 32.

The operation panel user interface module 34 may be any mechanism and/or medium that provides for the exchange of information between a user and the scheduled print device 30, such that the user may view scheduled print jobs and override one or more corresponding print schedules based on a user input. The user may override the print schedule by changing a scheduled print time or by requesting immediate printing of a scheduled print job. Alternatively, the user may request deletion of the scheduled print job. Exemplary user interfaces provided by the operation panel user interface module 34 are illustrated in FIGS. 11A-11C.

The print job filter module 36, parses a print job and identifies if the print job received by the scheduled print device 30 is a scheduled print job or a regular print job based on, for example, scheduled print related commands. If the print job is of the scheduled type, the print job filter module 36 stores the print job in the storage 44 for further processing and creates a schedule for the job scheduling module 38. Alternatively, the schedule may be created by the job scheduling module 38 or other separate module. The job scheduling module 38 maintains and executes a list of scheduled print jobs stored in the scheduled print device 30. The job scheduling module 38 can be accessed from an operation panel of the scheduled print device 30, through a web configuration module 40, or web service API module 42 to modify or delete scheduled print jobs. Further, the job scheduling module 38 may forward the scheduled print job to one or more normal print devices 26 for printing, based on whether multiple destinations are designated for the scheduled print job or the scheduled print job cannot be completed due to an error (e.g., due to a lack of resources including paper, toner, oil, etc.) in the scheduled print device 30. In other embodiments, the scheduled print job is forwarded by another separate module, such as a dedicated scheduled print job forwarding module.

The web configuration module 40 may be implemented by an mechanism or process for generating Web pages, which allows a user or an administrator to remotely configure and manage (e.g., request immediate printing of, modify, or delete scheduled print jobs) the scheduled print application 32. The web service API module 42 exposes scheduled print data as a Web Service from the scheduled print device 30. For example, by accessing the web service API module 42, a client application running on, for example, a personal computer can collect data from the scheduled print application. Further, the client application can also collect data from multiple devices (e.g., a plurality of scheduled print devices 30) by accessing the web service APIs of the respective multiple devices. For example, the web service API can be used to create a dashboard application to collect scheduled print job information from a plurality of scheduled print devices 30.

The scheduled print device 30 also includes storage 44 which is configured to store the scheduled print job data 46 received from the client device 20 and data related to the scheduled print job. In one embodiment, the scheduled print job data 46 includes schedule data defining a time and/or date when the print job is to be printed. In other embodiments, the schedule data includes information that the scheduled print device 30 uses to automatically determine the time and/or date when the print job is to be printed. For example, a time and/or date may be automatically determined based on schedule data including an identity of the user requesting the print job, the size of the print job, a priority of the print job, a location from which the print job is requested, a code corresponding to a time and/or date, etc.

The notification module 48 notifies the user requesting the scheduled print job of a status of the scheduled print job or the device (e.g., if there is any error, etc.). The notification module 48 may notify the user through e-mail, short message service (SMS), instant message service (IM), tweet, or a pop up message sent to the client device 20 or other predetermined device, when the scheduled print job is completed or if the scheduled print job was not able to be completed at a specified time due to an error in the scheduled print device 30.

For example, the notification module 48 may generate and send a message indicating whether the scheduled print job was completed successfully at a scheduled time. When the scheduled print job is completed successfully, the notification module 48 generates and sends a message confirming that the scheduled print job was outputted successfully. When the scheduled print job was not completed successfully, the notification module 48 may generate and send a message indicating an error. The error message may further specify a rescheduled time or alternative print device (e.g., normal print device 26) for printing the scheduled print job.

In one embodiment, the notification module 48 may generate a reminder message, to remind a user that the scheduled print job is scheduled to be outputted at the scheduled time. For example, the notification module 48 may generate a message reminding a user that the scheduled print job will be printed in X minutes. The message may optionally include a link or other mechanism to allow the user to modify or delete the scheduled print job prior to the scheduled print time. The user may modify or delete the scheduled print job, for example, by accessing the web configuration module 42.

As discussed above, the message generated by the notification module 48 may be sent to a user, for example, via an e-mail. Further, the message may be sent using a text messaging system such as SMS. In an alternative embodiment, the message may be sent using an instant messaging service such as the AOL®, Google®, Yahoo®, or Blackberry® instant messaging services. The message may be addressed to a designated user by, for example, e-mail address or IM identifier. Alternatively, the message may be addressed to a designated user device by, for example, IP address, mobile phone number, home phone number, network identifier, etc. The addressing information may be included in the scheduled print job, or determined based on information such as a user ID included in the scheduled print job.

The e-mail server 50 may include an e-mail application 52 and an e-mail storage 54. The e-mail application 52 is installed on the e-mail server 50 and provides e-mail services. The e-mail server 50 may exchange information with the client device 20, the scheduled print device 30, and/or other user device, using one or a variety of different protocols. The different protocols may include, for example, the Internet Message Access Protocol (IMAP), Post Office Protocol 3 (POP 3), Simple Mail Transfer Protocol (SMTP), or the HTTP protocol. The e-mail storage 54 stores e-mail messages addressed to one or more users.

However, it is noted that the e-mail server 50 is not required in embodiments in which the message generated by the notification module 48 is not sent via e-mail. For example, when the message generated by the notification module 48 is sent via SMS or IM the scheduled printing system may include a SMS service provider or IM service provider, respectively.

Figure 4:
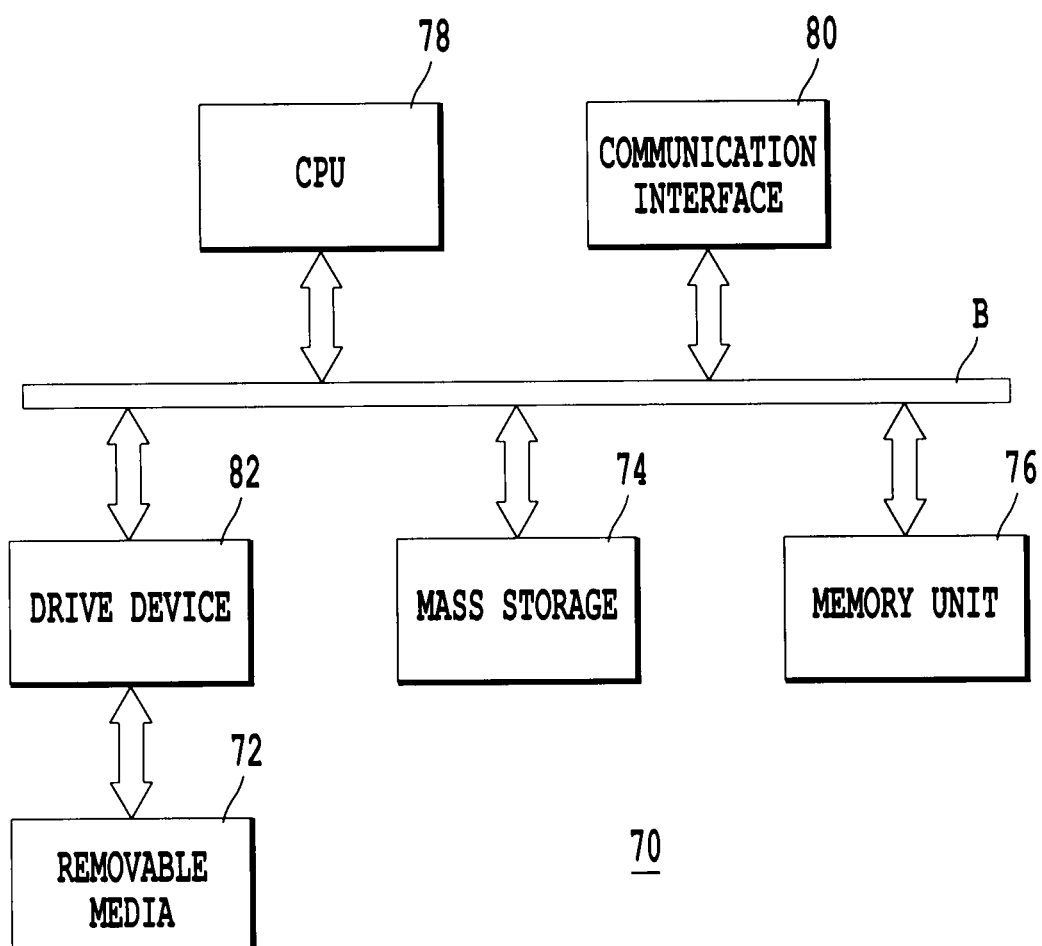
FIG. 4 illustrates hardware components of one embodiment of the client device and the e-mail server.

FIG. 4 illustrates a computer system 70 in which embodiments of the client device 20, the e-mail server 50, or other user device for receiving a scheduled print job status message may be implemented. The client device 20, the e-mail server 50, or the other user device may be implemented in, for example, workstations, personal computers, laptop computers, personal digital assistants (PDAs), cellular telephone devices, or other mobile devices. The computer system 70 includes a bus B or other communication mechanism for communicating information such as address information and data, and a CPU (or processor) 78 coupled with the bus B for processing the information. The computer system 70 also includes a memory unit (or main memory) 76, such as a random access memory (RAM) or other dynamic storage device (e.g., dynamic RAM (DRAM), static RAM (SRAM), and synchronous DRAM (SDRAM)), coupled to the bus B for storing information and instructions to be executed by the CPU 78. In addition, the memory unit 76 may be used for storing temporary variables or other intermediate information during the execution of instructions by the CPU 78. The computer system 70 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 78.

The computer system 70 may also include a disk controller coupled to the bus B to control one or more storage devices for storing information and instructions, such as mass storage 74 which may be a hard disk drive, for example, and drive device 82 (e.g., floppy disk drive, read-only optical disc drive, read/write optical disc drive, optical disc jukebox, tape drive, flash memory or a flash memory based drive, and removable magneto-optical drive). The storage devices may be added to the computer system 70 using an appropriate device interface (e.g., small computer system interface (SCSI), integrated device electronics (IDE), enhanced-IDE (E-IDE), direct memory access (DMA), or ultra-DMA).

The computer system 70 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)) in order to carry out the desired functionality.

The computer system 70 may also include a display controller coupled to the bus B to control a display, such as a cathode ray tube (CRT), organic light emitting diode (OLED) display, liquid crystal display (LCD), or projector, for displaying information to a computer user. The computer system 70 may include input devices, such as a keyboard, pointing device, or touch display, for interacting with a computer user and providing information to the CPU 78. The pointing device, for example, may be a mouse, a trackball, or a pointing stick for communicating direction information and command selections to the CPU 78 and for controlling cursor movement on the display. In addition, a printer may provide printed listings of data stored and/or generated by the computer system.

The computer system 70 performs a portion or all of the processing steps in response to the CPU 78 executing one or more sequences of one or more instructions contained in a memory, such as the memory unit 76. Such instructions may be read into the memory unit 76 from another computer-readable medium, such as the mass storage 74 or a removable media 72. One or more processors in a multi-processing arrangement may also be employed to execute the sequences of instructions contained in the memory unit 76 or the removable media 72. In alternative embodiments, hard-wired circuitry may be used in place of or in combination with software instructions. Thus, embodiments are not limited to any specific combination of hardware circuitry and software.

As stated above, the computer system 70 includes at least one removable media 72, which is a computer-readable medium, or memory for holding instructions programmed according to the teachings described herein and for containing data structures, tables, records, or other data described herein. Examples of computer-readable media are compact discs, hard disks, floppy disks, tape, magneto-optical disks, PROMs (EPROM, EEPROM, flash EPROM), DRAM, SRAM, SDRAM, or any other magnetic medium, optical discs (e.g., CD-ROM), or any other storage medium from which a computer can read.

Stored on any one or on a combination of computer-readable media is software for controlling the computer system 70, for driving a device or devices, and for enabling the computer system 70 to interact with a human user. Such software may include, but is not limited to, device drivers, operating systems, development tools, and applications software. Such computer-readable media further includes the computer program product for performing all or a portion (if processing is distributed) of the processing described herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The term "computer-readable medium" as used herein refers to any medium that participates in providing instructions to the CPU 78 for execution. A computer-readable medium may take many forms, including but not limited to, non-volatile media, and volatile media. Non-volatile media includes, for example, optical, magnetic disks, and magneto-optical disks, such as the mass storage 74 or the removable media 72. Volatile media includes dynamic memory, such as the memory unit 76.

Various forms of computer-readable media may be involved in carrying out one or more sequences of one or more instructions to the CPU 78 for execution. For example, the instructions may initially be carried on a magnetic disk of a remote computer. The remote computer can load the instructions remotely into a dynamic memory and send the instructions over a telephone line using a modem. A modem local to the computer system 70 may receive the data on the telephone line and use an infrared transmitter to convert the data to an infrared signal. An infrared detector coupled to the bus B can receive the data carried in the infrared signal and place the data on the bus B. The bus B carries the data to the memory unit 76, from which the CPU 78 retrieves and executes the instructions. The instructions received by the memory unit 76 may optionally be stored on mass storage 74 either before or after execution by the CPU 78.

The computer system 70 also includes a communication interface 80 coupled to the bus B. The communication interface 80 provides two-way data communication coupling to a network that is connected to, for example, a LAN, or to another communications network such as the Internet. For example, the communication interface 80 may be a network interface card to attach to any packet switched LAN. As another example, the communication interface 80 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 80 sends and receives electrical, electromagnetic, or optical signals that carry digital data streams representing various types of information. However, in other embodiments, the communication interface 80 may simply provide for one-way data communication.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, CAT 6 cable, coaxial cable, optical fiber, etc). The signals through the various networks and the signals on the network and through the communication interface 80, which carry the digital data to and from the computer system 70, may be implemented in baseband signals, or carrier wave based signals. The baseband signals convey the digital data as un-modulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as un-modulated baseband data through a "wired" communication channel and/or sent within a predetermined frequency band, different than baseband, by modulating a carrier wave. The computer system 70 can transmit and receive data, including program code, through the network and the communication interface 80. Moreover, the network may provide a connection to a mobile device such as a personal digital assistant (PDA) laptop computer, or cellular telephone.

Alternatively, the client device 20 may be implemented in a digital copier/printer multi-function machine (MFP), as further discussed below. For example, the client device 20 may capture an image, which is transmitted to the scheduled print device 30 for outputting. In other embodiments, the scheduled print job may be requested at the scheduled print device 30.

Figure 5A:
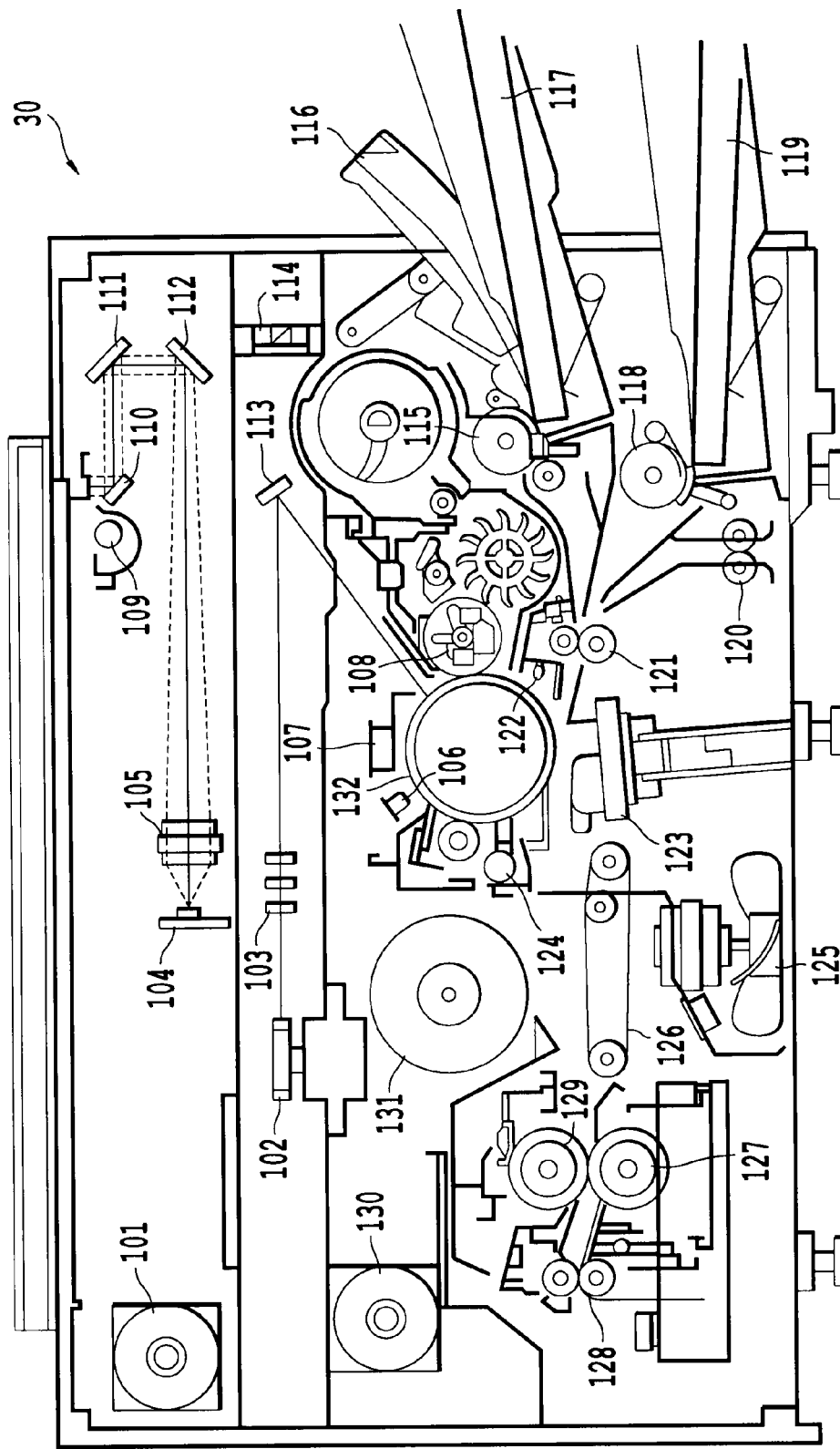
FIG. 5A illustrates hardware components of an exemplary printing device.

FIG. 5A illustrates an exemplary mechanical layout of the normal print device 26 and/or scheduled print device 30 illustrated in FIG. 2, which may correspond to a digital copier/printer multi-function machine (MFP). In FIG. 5A, 101 is a fan for the scanner, 102 is a polygon mirror used with a laser printer, and 103 designates an F theta lens used to collimate light from a laser. Reference number 104 designates a sensor for detecting light from the scanner, 105 is a lens for focusing light from the scanner onto the sensor 104 and 106 is a quenching lamp used to erase images on the photoconductive drum 132. There is a charging corona unit 107 and a developer roller 108. Reference numeral 109 designates a lamp used to illustrate a document to be scanned and 110, 111, and 112 designate mirrors used to reflect light onto the sensor 104. There is a drum mirror 113 used to reflect light to the photoconductive drum 132 originating from the polygon mirror 102. Reference numeral 114 designates a fan used to cool the charging area of the normal print device 26 and/or scheduled print device 30, and 115 is a first paper feed roller used for feeding paper from the first paper cassette 117, and 116 is a manual feed table. Similarly, element 118 is a second paper feed roller for the second cassette 119. Reference numeral 120 designates a relay roller, 121 is a registration roller, 122 is an image density sensor, and 123 is a transfer/separation corona unit. Reference numeral 124 is a cleaning unit, 125 is a vacuum fan, element 126 is a transport belt, 127 is a pressure roller, and 128 is an exit roller. Reference numeral 129 is a hot roller used to fix toner onto the paper, 130 is an exhaust fan, and 131 is the main motor used to drive the digital copier/printer multi-function machine.

Figure 5B:
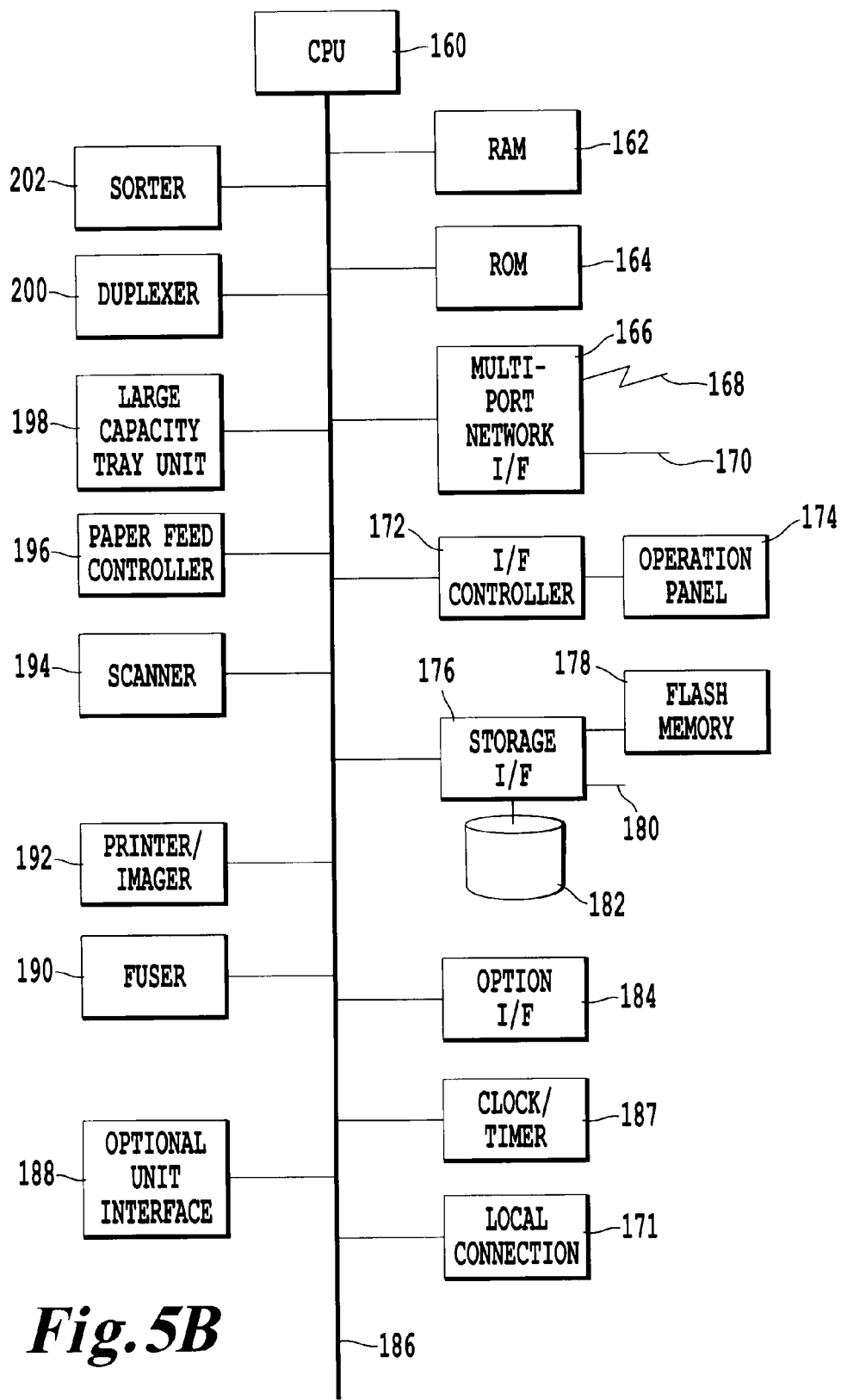
FIG. 5B illustrates electronic components of the printing device illustrated in FIG. 5A.

FIG. 5B illustrates an exemplary block diagram of the electronic components of the normal print device 26 and/or scheduled print device 30 illustrated in FIG. 5A. The CPU 160 is a microprocessor and acts as the system controller. There is a random access memory (RAM) 162 to store dynamically changing information including operating parameters of the digital copiers. A read-only memory (ROM) 164 stores the program code used to run the normal print device 26 and/or scheduled print device 30 and also information describing the static-state data such as model number, serial number, and default parameters that would not change over the life of the machine. When the device needs to boot up from either a hard disk or flash memory, the ROM memory 164 stores the boot sequence.

Similar to the computer system 70 discussed above, the normal print device 26 and/or scheduled print device 30 may perform a portion of or all processing steps in response to the CPU 160 executing one or more sequences of one or more instructions contained in a memory, such as the ROM 164 or of one of the memory types discussed above with respect to the computer system 70. The instructions may be read into the memory from another computer-readable medium, as discussed above, such as mass storage or removable media. One or more processors in a multi-processing arrangement may also be employed to execute the sequences of instructions contained in the memory. In alternative embodiments, hard-wired circuitry may be used in place of or in combination with software instructions. Thus, embodiments are not limited to any specific combination of hardware circuitry and software.

There is provided a multi-port communication interface 166, which allows the normal print device 26 and/or scheduled print device 30 to communicate with external devices. Reference numeral 168 represents a telephone or other communication line including a wireless channel. Reference number 170 represents a wired communication line, such as a wired telephone or Ethernet connection. Further information of the multi-port communication interface is described with respect to FIG. 5C. An interface controller 172 is used to connect an operation panel 174 to a system bus 186. The operation panel 174 includes standard input and output devices found on a digital copier/printer multi-function machine or business office appliance including some function buttons such as reduce/enlarge and numeric buttons, etc. Additionally, a liquid crystal display, or other displays as discussed above, may be included within the operation panel 174 to display parameters and messages of the apparatus. The operation panel also can be a touch panel in which the display and function buttons may change according to the context.

A local connection interface 171 is a connection through a local port such as RS232, USB and IEEE 1394. This interface 171 allows external devices to be attached to the apparatus.

A storage interface 176 connects storage devices to the system bus 186. The storage devices include a flash memory 178 and a disk 182. There is a connection 180 connected to the storage interface 176 which allows for additional memory devices to be connected. The flash memory 178 is used to store semi-static data which describes parameters of the device which infrequently change over the life of the apparatus, including the option configuration, network access parameters, and work group, and also can be used to store dynamic data that describes parameters dynamically changing such as print count. An option interface 184 allows additional option devices to be attached and controlled. A clock/timer 187 is utilized to keep track of both the time and date and also to measure elapsed time.

On the left side of FIG. 5B, the various sections making up the normal print device 26 and/or scheduled print device 30 are illustrated. Reference numeral 202 designates a sorter and contains sensors and actuators used to sort the output of the normal print device 26 and/or scheduled print device 30. There is a duplexer 200 that allows a duplex operation to be performed and includes conventional sensors and actuators. The normal print device 26 and/or scheduled print device 30 includes a large capacity tray unit 198 that allows paper trays holding a large number of sheets to be used. The large capacity tray unit 198 includes conventional sensors and actuators.

A paper feed controller 196 is used to control the operation of feeding paper into and through the normal print device 26 and/or scheduled print device 30. A scanner 194 is used to scan images into the normal print device 26 and/or scheduled print device 30 and includes a control system of conventional scanning elements such as a light, mirror, etc. Additionally, scanner sensors are used, such as a home position sensor, to determine that the scanner is in the home position, and a lamp thermistor is used to ensure proper operation of the scanning lamp. There is a printer/imager 192, which prints the output of the normal print device 26 and/or scheduled print device 30 and includes a conventional laser printing mechanism, a toner sensor, and an image density sensor. The fuser 190 is used to fuse the toner onto the page using a high temperature roller and includes an exit sensor, a thermistor to assure that the fuser 190 is not over heating, and an oil sensor. Additionally, there is an optional unit interface 188 used to connect optional units such as an automatic document feeder, a different type of sorter/collator, or other elements that can be added to the normal print device 26 and/or scheduled print device 30.

Figure 5C:
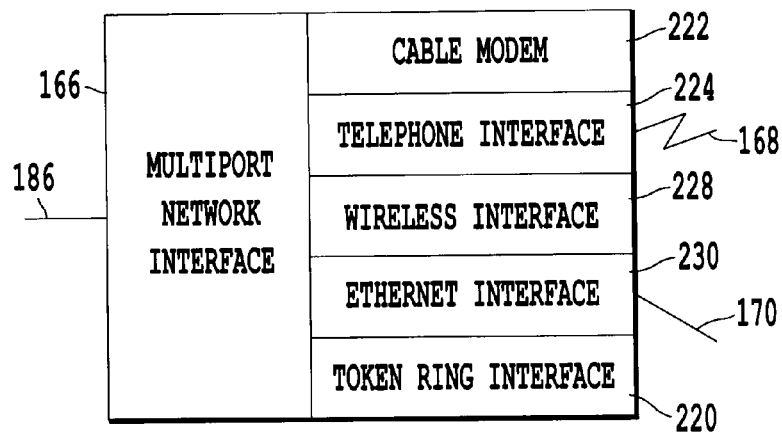
FIG. 5C illustrates details of the multi-port communication interface illustrated in FIG. 5B.

FIG. 5C illustrates details of the multi-port network interface 166. The normal print device 26 and/or scheduled print device 30 may communicate to external devices through a Token Ring interface 220, a cable modem unit 222 that has a high speed connection over cable, a conventional telephone interface 224 that connects to a telephone line 168, a wireless interface 228, and an Ethernet interface 230. Other interfaces (not shown) include, but are not limited to, a Digital Subscriber line. The multi-port network interface does not need to have all the interfaces described in FIG. 5C.

The CPU or other microprocessor or circuitry executes a monitoring process to monitor the state of each of the sensors of the normal print device 26 and/or scheduled print device 30, and a sequencing process is used to execute the instructions of the code used to control and operate the normal print device 26 and/or scheduled print device 30. Additionally, there is (1) a central system control process executed to control the overall operation of the normal print device 26 and/or scheduled print device 30 and (2) a communication process used to assure reliable communication to external devices connected to the normal print device 26 and/or scheduled print device 30. The system control process monitors and controls data storage in a static state (e.g., the ROM 164 of FIG. 5B), a semi-static state (e.g., the flash memory or disk 182), or a dynamic state (e.g., a volatile or non-volatile memory, the RAM 162 or the flash memory 178 or disk 182).

The above details have been described with respect to a digital copier/printer multi-function machine, but this embodiment is equally applicable to other business office machines or devices such as an analog copier, a facsimile machine, a printer, a facsimile server, or other business office machines and business office appliances that are configured to store data for future processing.

Figure 5D:
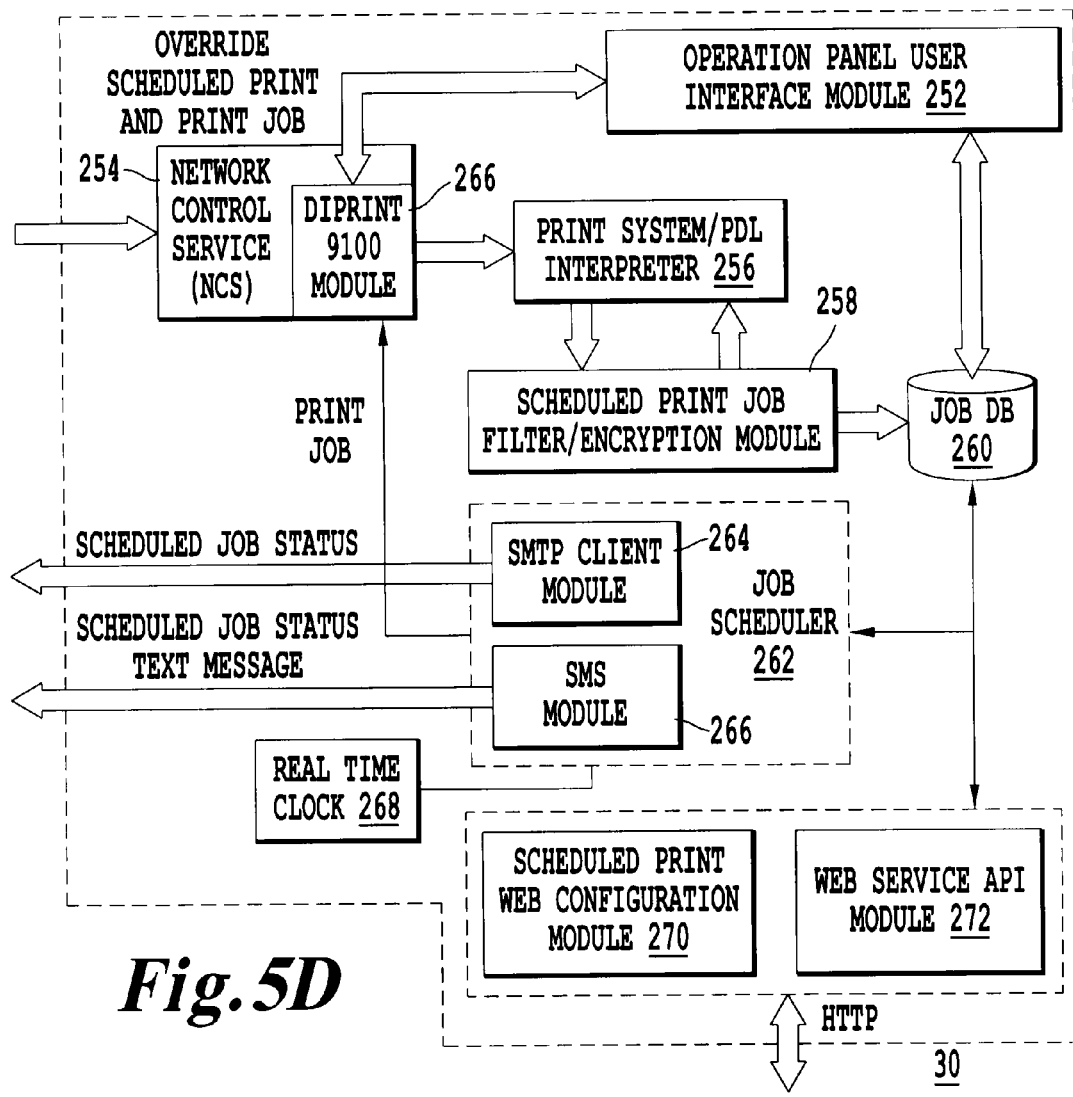
FIG. 5D illustrates an exemplary scheduled print application for a scheduled print device.

FIG. 5D illustrates a flow diagram between electronic components in an exemplary embodiment of the scheduled print device 30. As illustrated in FIG. 5D, a network control service (NCS) 254 receives a print job from the printer driver 24 of the client device 20, which is connected to a TCP port (e.g., port 9100) of the scheduled print device 30. The print job may include schedule data (e.g., defining a scheduled print time and/or date) generated by the printer driver 24. Alternatively, the schedule data includes information for the scheduled print device 30 to automatically determine the scheduled print time and/or date. The NCS 254 includes Diprint 9100 module 266, which monitors port 9100 for TCP print jobs from the client device 20, and controls communications over the network. However, in alternate embodiments, the Diprint 9100 module 266 may be configured to monitor one or more other port numbers. After receiving the print job, the NCS 254 transfers the print job to print system/printer description language (PDL) interpreter 256, which forwards the print job to the scheduled print job filter/encryption module 258. The scheduled print job filter/encryption module 258 determines if the print job is a scheduled print job. For example, the print job may include one or more Print Job Language (PJL) or PDL commands/comments that specify scheduled printing is to be used. Alternatively, the print job may be determined to be a scheduled print job based on the inclusion of schedule data. If the print job is a scheduled print job, the scheduled print job filter/encryption module 258 stores the print job in Job DB 260. The scheduled print job filter/encryption module 258 may optionally encrypt the print job prior to storing the print job in the Job DB 260. Further, a job scheduler 262 maintains a job schedule database of any scheduled print jobs stored in the scheduled print device 30, and schedules the execution of the scheduled print job stored in the Job DB 260 and executes the scheduled print job at the appropriate time.

Further, the scheduled print job filter/encryption module 258 extracts e-mail and/or mobile phone number information from the print job. The scheduled print job filter/encryption module 258 sends the extracted e-mail information to an SMTP client module 264, which e-mails scheduled print job status information based on the extracted e-mail information, and the extracted mobile phone number information to SMS module 266, which sends a text message including the scheduled print job status information based on the extracted mobile phone number information. If the scheduled print job filter/encryption module 258 determines that the print job is not a scheduled print job, the scheduled print job filter/encryption module 258 returns the print job to the print system/PDL interpreter 256, which interprets print data, e.g., PDL data included in the print job, and prints the print data associated with the print job. In one embodiment, the SMTP client module 264 and the SMS module 266 are included in the job scheduler 262. Alternatively, the SMTP client module 264 and/or the SMS module 266 may be provided separate from the job scheduler 262.

An operation panel user interface module 252 is configured to provide an interface for a user to access scheduled print jobs stored in the scheduled print device 30. When the user operates the operation panel user interface module 252, the user enters a user ID and corresponding authentication information. FIG. 11A illustrates an exemplary interface for the user to enter the user ID and corresponding authentication information. In other embodiments, a user may access the scheduled print jobs through other authenticating methods that may be based on the user's voice, biometric information, etc. After the user ID and the authentication information are inputted by the user, or the user is authenticated by other methods, the operation panel user interface module 252 retrieves scheduled print jobs associated with the user from the Job DB 260. In one embodiment, the scheduled print jobs are retrieved according to a user ID.

The retrieved scheduled print jobs are displayed to the user, for example, as illustrated in FIG. 11B. After one or more scheduled print jobs are selected by the user, the operation panel user interface module 252 performs a user requested action on the selected one or more scheduled print jobs. For example, when the user requests that one or more scheduled print jobs be printed immediately, the operation panel user interface module 252 pulls the selected one or more scheduled print jobs from the Job DB 260 and sends the one or more scheduled print jobs to the Diprint 9100 module 266. The Diprint 9100 module 266 forwards the one or more print jobs to the print system/PDL interpreter 256, which prints the print data associated with the one or more scheduled print jobs. When, the print system/PDL interpreter 256 is aware that the print job is not a scheduled print job, the print job may be printed without being forwarded to the scheduled print job filter/encryption module 258. Further, the user may request that the one or more scheduled print jobs be deleted or modified, as further discussed below.

The scheduled print web configuration module 270 and the web service API module 272 may connect to a user application or an administrator application using the hypertext transfer protocol (HTTP) or the hypertext transfer protocol secure (HTTPS). However, in other embodiments, the user application or the administrator application may connect to the scheduled print web configuration module 270 and the web service API module 272 using other communication protocols such as the file transfer protocol (FTP), the simple object access protocol (SOAP), or representational state transfer (REST). As discussed above, the user application or the administrator application may connect to the scheduled print web configuration module 270 and the web service API module 272 to manage (e.g., configuration information, edit or delete scheduled print jobs, etc.) the scheduled print device 30 or the scheduled print jobs stored therein, or to access status information such as a job log and error log stored on the scheduled print device 30. As noted above, in one embodiment, the scheduled print jobs may be managed using the user interfaces illustrated in FIGS. 16A-16D.

Figure 6:
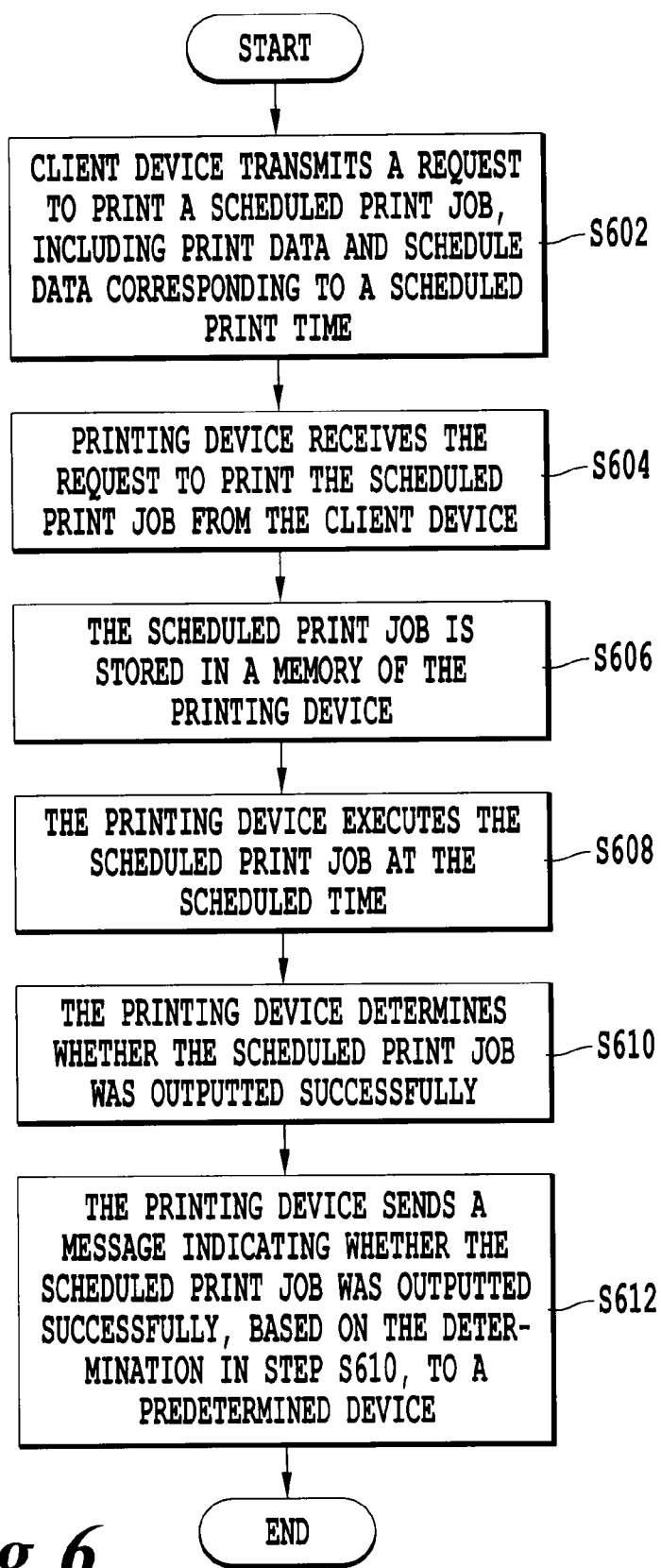
FIG. 6 illustrates a flow diagram of a scheduled print process according to one embodiment.

FIG. 6 provides an overview of an exemplary process for a scheduled print process. In step S602, the client device 20 transmits a request to print a scheduled print job to the scheduled print device 30. The scheduled print job request includes print data and schedule data corresponding to a scheduled print time. Alternatively, the schedule data may be provided separately from the print data. In one embodiment, the schedule data defines a time and/or date on which the scheduled print job is to be printed. In other embodiments, the scheduled print device 30 determines the time and/or date on which the scheduled print job is to be printed based on the schedule data. For example, the schedule data may correspond to an identifier (e.g., user ID) used by the scheduled print device 30 to identify a predetermined time and/or date (e.g., 2 pm) on which the print job is to be printed.

In step S604, the scheduled print device 30 receives the request to print the scheduled print job from the client device 20. The scheduled print device 30 stores the received scheduled print job in memory, in step S606. In step S608, the scheduled print device executes the scheduled print job at the scheduled time. The scheduled print device 30, in step S610, determines whether the scheduled print job was outputted successfully. After determining whether the scheduled print job was outputted successfully, the scheduled print device 30 sends a message indicating whether the scheduled print job was outputted successfully to a predetermined device, or user, such as the client device 20 or other device associated with a user designated to receive the message.

Figure 7:
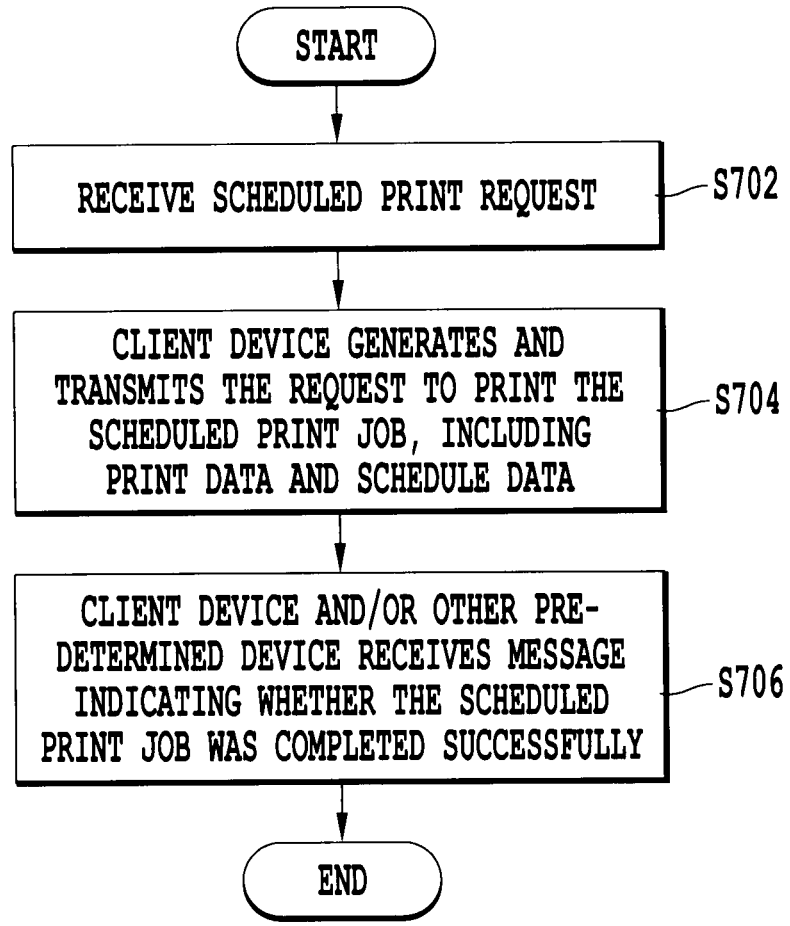
FIG. 7 illustrates a flow diagram of one embodiment of a scheduled print process performed at the client device.

FIG. 7 illustrates an exemplary process performed by the client device 20. In step S702, the client device 20 receives a scheduled print request from a user of the client device 20. In response to the scheduled print request, the client device 20 generates a request to print a scheduled print job, including print data and scheduled data, and transmits the scheduled print job request, in step S704. The scheduled print job request may be generated, for example, in response to a command to print a document using a word processing application. Further, in step S706, the client device 20 and/or other predetermined device receives a message indicating whether the scheduled print job was completed successfully.

Figure 8:
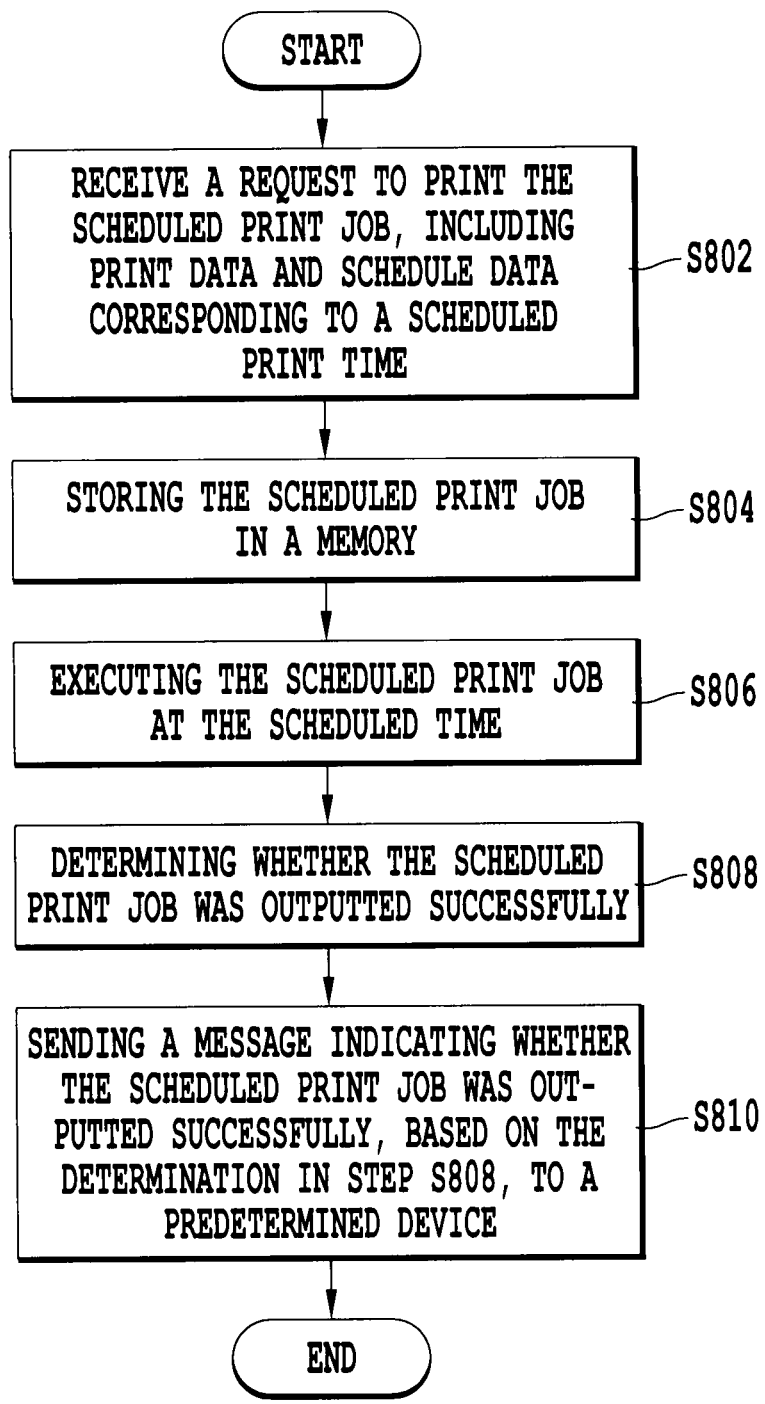
FIG. 8 illustrates a flow diagram of one embodiment of a scheduled print process performed at a scheduled print device.

FIG. 8 illustrates an exemplary process performed by the scheduled print device 30. As illustrated in FIG. 8, in step S802, the scheduled print device 30 receives the request to print a scheduled print job, including print data and schedule data corresponding to a scheduled print time. As noted above, the schedule data may define a time and/or date at which time the scheduled print job is to be printed. Alternatively, the schedule data may be used by the scheduled print device 30 to automatically determine a scheduled print time. The scheduled print job is stored in memory, in step S804, and executed at the scheduled time, in step S806. The scheduled print device 30 determines whether the scheduled print job was outputted successfully, in step S808, and sends a message indicating whether the scheduled print job was outputted successfully to a predetermined device, or user, in step S810.

Figure 9A:
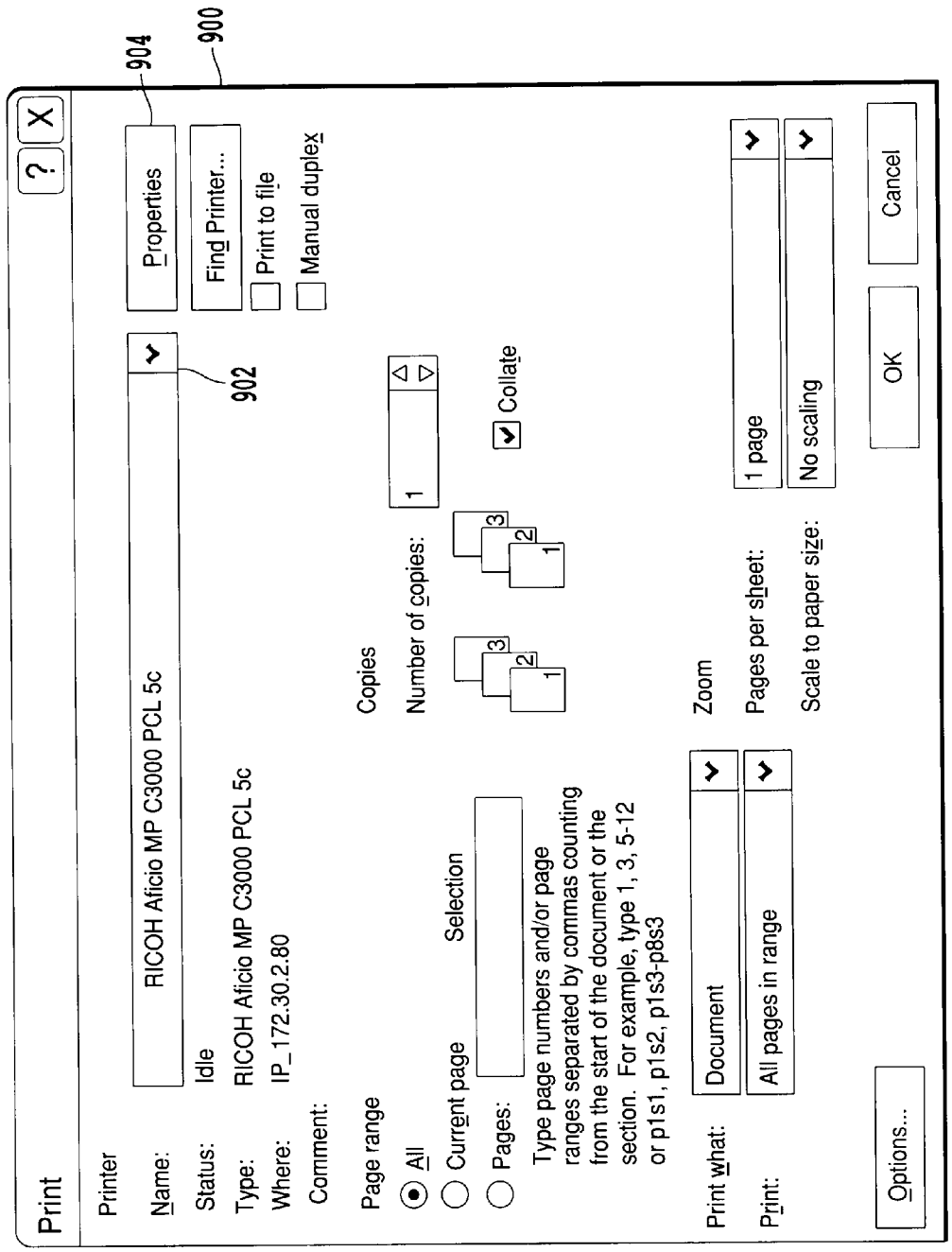
Figure 9B:
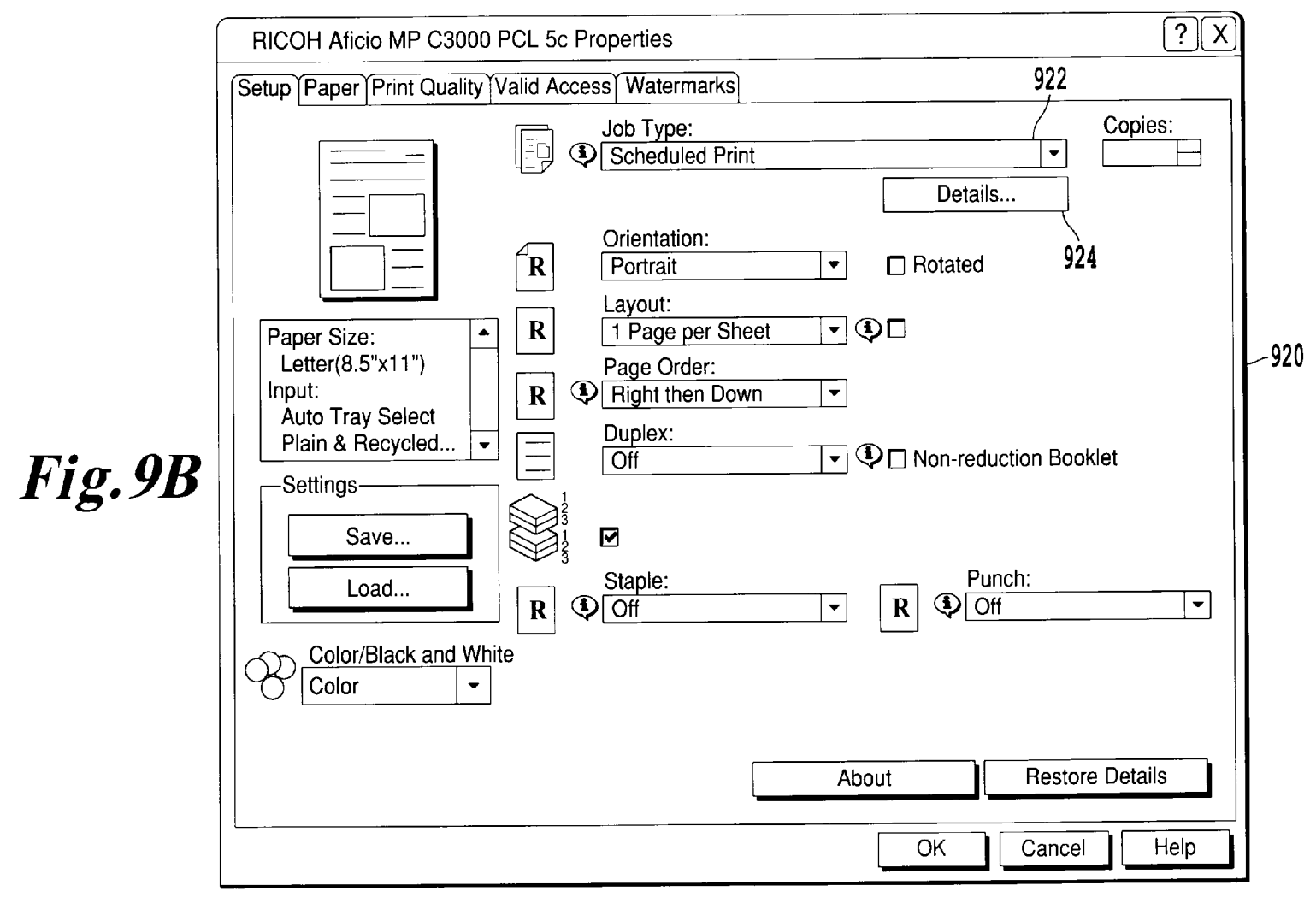

FIGS. 9A-9D illustrate exemplary user interfaces for requesting a scheduled print job. For example, a Print window 900 is displayed to a user of the client device 20. The user selects a printer, such as scheduled print device 30, to process a print job in a dropdown window 902. If the user selects the properties button 904, a Printing Preferences window 920, as illustrated in FIG. 9B, is displayed. The Printing Preferences window 920 allows the user to define several printing options, including whether the print job is to be of the scheduled print type in a drop down window 922. For print jobs of the scheduled print type, the user may define further details by, for example, selecting the details button 924. When the user selects the details button 924, a Scheduled Print Details window 960 is displayed.

The Scheduled Print Details window 960 includes a user ID field 962, password field 964, e-mail address field 968, mobile number field 970, scheduled date field 972, scheduled time field 974, distribute selection box 976, and details button 978. A user may access the scheduled print application 32 on the scheduled print device 30 using the user ID and/or password entered into fields 962 and 964, respectively. The e-mail address field 968 and mobile number field 970, when provided with appropriate information, are used by the scheduled print device 30 to provide job status notifications to a predetermined device or designated user. The scheduled date and time fields 972 and 974, define the date and time when the scheduled print job should be printed. Further, the distribute selection box 976 enables job distribution to selected one or more printing devices (e.g., normal print devices 26a-26c). The one or more printing devices may be designated, for example, by selecting details button 978, which causes a Scheduled Print Distribute Details window 980 to be displayed to the user. In the Scheduled Print Distribute Details window, fields 982a-982j are provided for printers 1-10, respectively, to which the scheduled print job may be distributed. However, other embodiments may provide fields for one or more printers, not limited to ten printers. The printers may be designated using an IP address, host name, or any other information used by the scheduled print device 30 to address the printers. Further, the information identifying the printers may be manually entered into the printer fields 982a-982j, selected from a list of available printers, or automatically populated based on predetermined criteria such as user ID. When communication methods other than e-mail or SMS are employed for the providing the scheduled print job notifications, the e-mail address filed and/or mobile number fields 968 and 970 can be modified to accept information for sending the scheduled print job notifications according to the other communication methods.

FIG. 10 illustrates an exemplary set of PJL commands/ comments generated by the printer driver 22 for the scheduled print request. As illustrated in FIG. 10, the PJL commands include information regarding the print job type, user ID, e-mail address, password, mobile number, time at which the print job is scheduled, date at which the print job is scheduled, and IP addresses or host names of printers to which the print job is to be distributed. The PJL commands/comments are processed by the scheduled print device 30, as discussed with respect to FIG. 13.

FIGS. 11A-11C illustrate exemplary user interfaces for managing one or more scheduled print jobs at the scheduled print device 30. For example, initially a User Login window 1100 is displayed on an operation panel of the scheduled print device 30. The User Login window 1100 includes a user ID field 1102 and password field 1104. After user ID and password information entered by a user is authenticated, the operational panel of the scheduled print device 30 displays a Scheduled Print Job Management window 1110. The Scheduled Print Job Management window 1110 displays any scheduled print jobs associated with the authenticated user. When the listing of scheduled print jobs cannot be displayed in a single window, the user may user next and previous buttons 1114 and 1116 to navigate to different pages of the listing. Using selection boxes 1112a-1112d, the user may select one or more scheduled print jobs to manage. The user may delete one or more of the scheduled print jobs by selecting delete button 1118. Selection of the delete button 1118 deletes the scheduled print job from the memory of the scheduled print device 30 and a scheduled job database. A user may edit one or more of the scheduled print jobs by selecting edit button 1120. Selection of the edit button 1120 causes an Edit Schedule and Distribution Details window 1130, for example as illustrated in FIG. 11C, to be displayed to the user. Using the Edit Schedule and Distribution Details window 1130, the user may enter a new scheduled print date or time using fields 1132 and 1134, respectively. Further, the user may designate one or more printers to which the scheduled print job should be distributed using any one of fields 1136a-1136j. After the user enters any desired changes to the print schedule or distribution, the user selects apply button 1138 to save any changes. Alternatively, any changes may automatically be saved when the user exits the Edit Schedule and Distribution Details window 1130.

FIG. 12A illustrates an exemplary scheduled print job database schema. As illustrated in FIG. 12A, a scheduled job database includes a table of entries for each scheduled print job stored in the scheduled print device 30. The scheduled job database may include one or a combination of the entries illustrated in FIG. 12A. A description of the information defined in the scheduled job database is illustrated in FIG. 12B. For example, each entry in the scheduled job database is identified by a unique job identifier (i.e., a private key). The scheduled print job entry further includes a UserID and password, which correspond to the user ID and password included in the scheduled print job request generated by printer driver 22. A TimeStamp indicates the time the scheduled print job was received by the scheduled print device 30. The scheduled print job entry also includes ScheduleTime and ScheduleDate which define the time and date the scheduled print job is to be printed, and a PageCount which defines the number of pages to be printed. JobName, EmailID, and MobileNumber correspond to the job name, e-mail address, and mobile number sent from the printer driver 22. PrinterAddress1-PrinterAddress10 correspond to the information sent from the printer driver 22 if the distribute option was selected and at least one printer address or host name provided to the printer driver 22.

Figure 13:
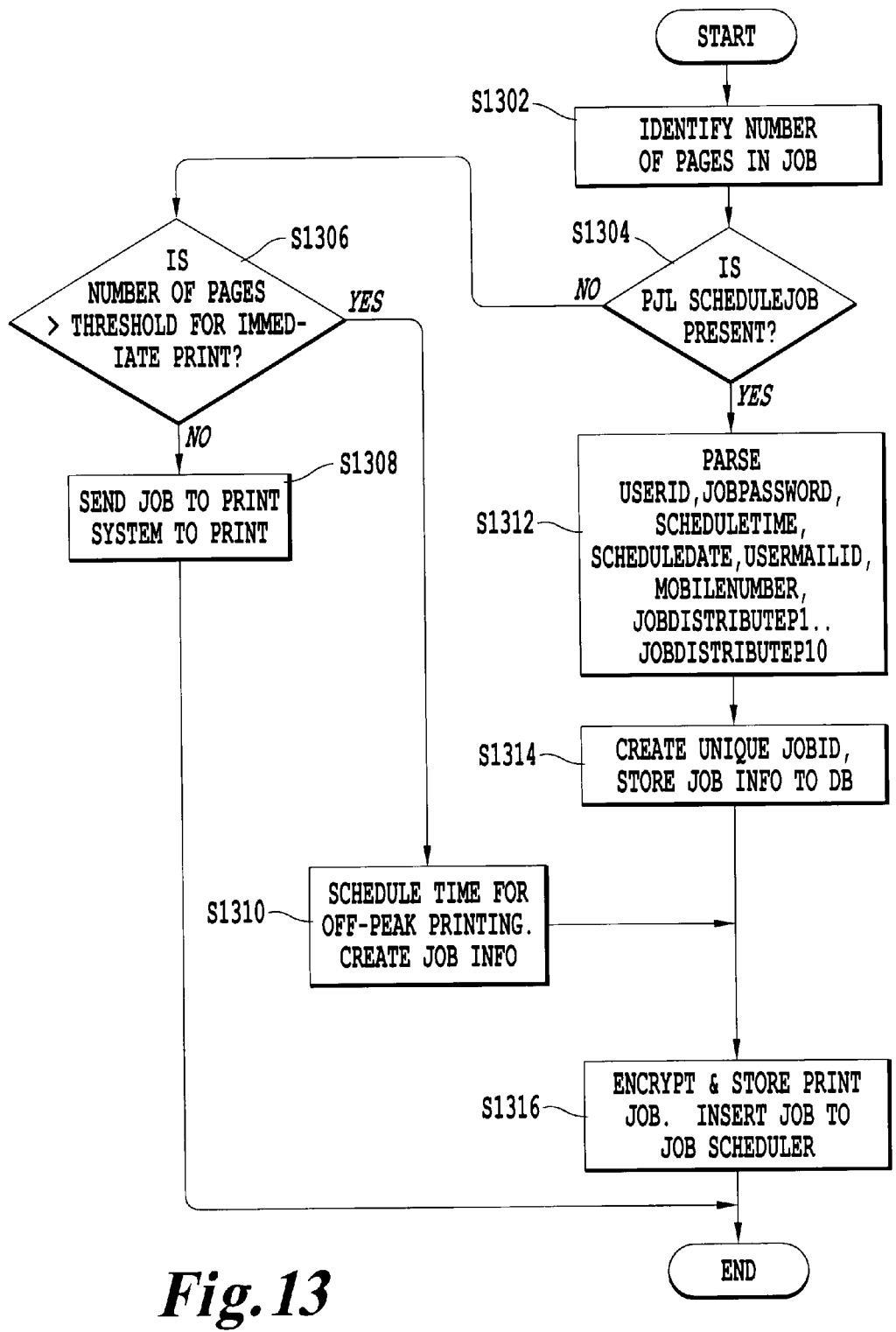
FIG. 13 illustrates an exemplary flow diagram for processing a print job request in a scheduled print device.

FIG. 13 illustrates an embodiment for processing a print job received by the scheduled print device 30. The print job may include PJL commands/comments that are generated by the printer driver 22 of the client device 20. An exemplary set of PJL commands/comments generated by the printer driver 22 is illustrated in FIG. 10. As illustrated in FIG. 13, the scheduled print device 30 identifies the number of pages in the received print job, in step S1302. In step S1304, the scheduled print device 30 determines whether the print job is a scheduled print job by, for example, determining whether the PJL commands/comments associated with the print job includes "PDL SCHEDULEJOB". Alternatively, the scheduled print device 30 determines whether the print job is a scheduled print job based off other predetermined information stored in the PJL commands/comments. If the print job is determined not to be a scheduled print job, the scheduled print device 30 determines whether the number of pages in the print job exceeds a threshold for immediate print, in step S1306. When the number of pages in the print job does not exceed the threshold for immediate print, the print job is sent to the print system for printing, in step S1308. However, when the number of pages in the print job exceed the threshold for immediate print, in step S1310, the print job is scheduled for off peak printing, and job information corresponding to the print job is created and stored into a Job Schedule Database.

On the other hand, when the print job is a scheduled print job, the scheduled print device 30 parses the PJL commands/comments that are generated by the printer driver 22 of the client device 20, in step S1312. In step S1314, a unique JobID is created and job information corresponding to the print job is stored into the Job Schedule Database. After the job information corresponding to the print job is stored in steps S1310 or S1314, the print job is encrypted and stored in the scheduled print device 30. Further, the scheduled print job is added to the job scheduler of the scheduled print device 30.

Figure 14:
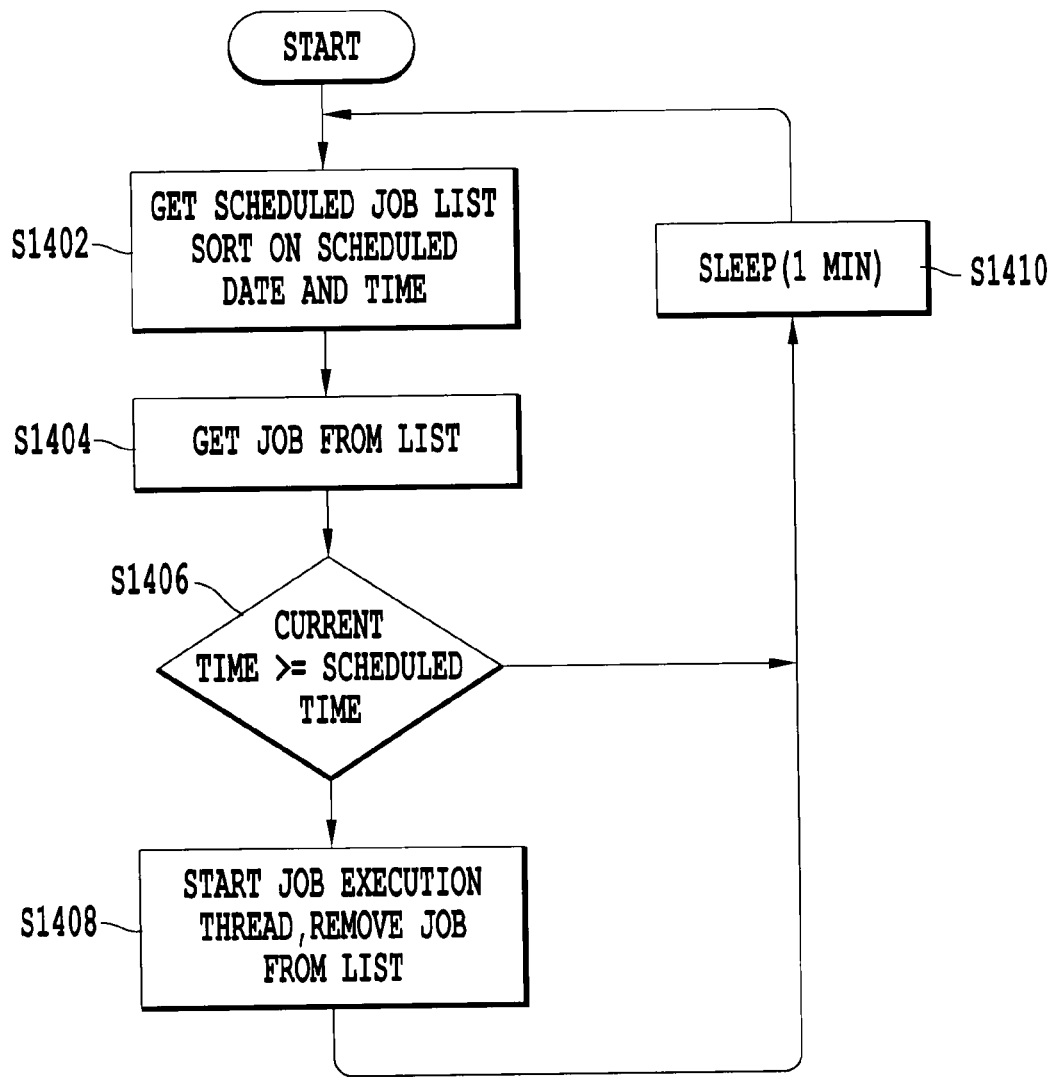
FIG. 14 illustrates an exemplary flow diagram for scheduling execution of a scheduled print job.

FIG. 14 illustrates a process performed by an exemplary embodiment of the Job Scheduler included in the scheduled print device 30. The Job Scheduler manages the execution of a print job execution thread for a scheduled print job, at the scheduled time. In one embodiment, the Job Scheduler steps through a scheduled job list that has been sorted based on a scheduled date and time for printing. If the current time is equal to or greater than the scheduled time corresponding to a scheduled print job, the Job Scheduler starts a new thread to execute the scheduled print job in the scheduled job list. A job execution thread then handles the job printing process.

For example, the Job Scheduler accesses the scheduled job list in step S1402, and retrieves a scheduled print job from the scheduled job list in step S1404. The Job Scheduler determines whether the current time is greater than or equal to the scheduled time for printing the scheduled print job, in step S1406. If the current time is greater than or equal to the scheduled time, a job execution thread for the scheduled print job is started, and the scheduled print job is removed from the scheduled job list, in step S1408. If the current time is determined to be less than the scheduled time in step S1406, or after the job execution thread is executed in step S1408, the Job Scheduler sleeps for a predetermined period of time (e.g., one minute) in step S1410. After sleeping for the predetermined period of time in step S1410, the Job Scheduler repeats the process beginning at step S1402.

Figure 15:
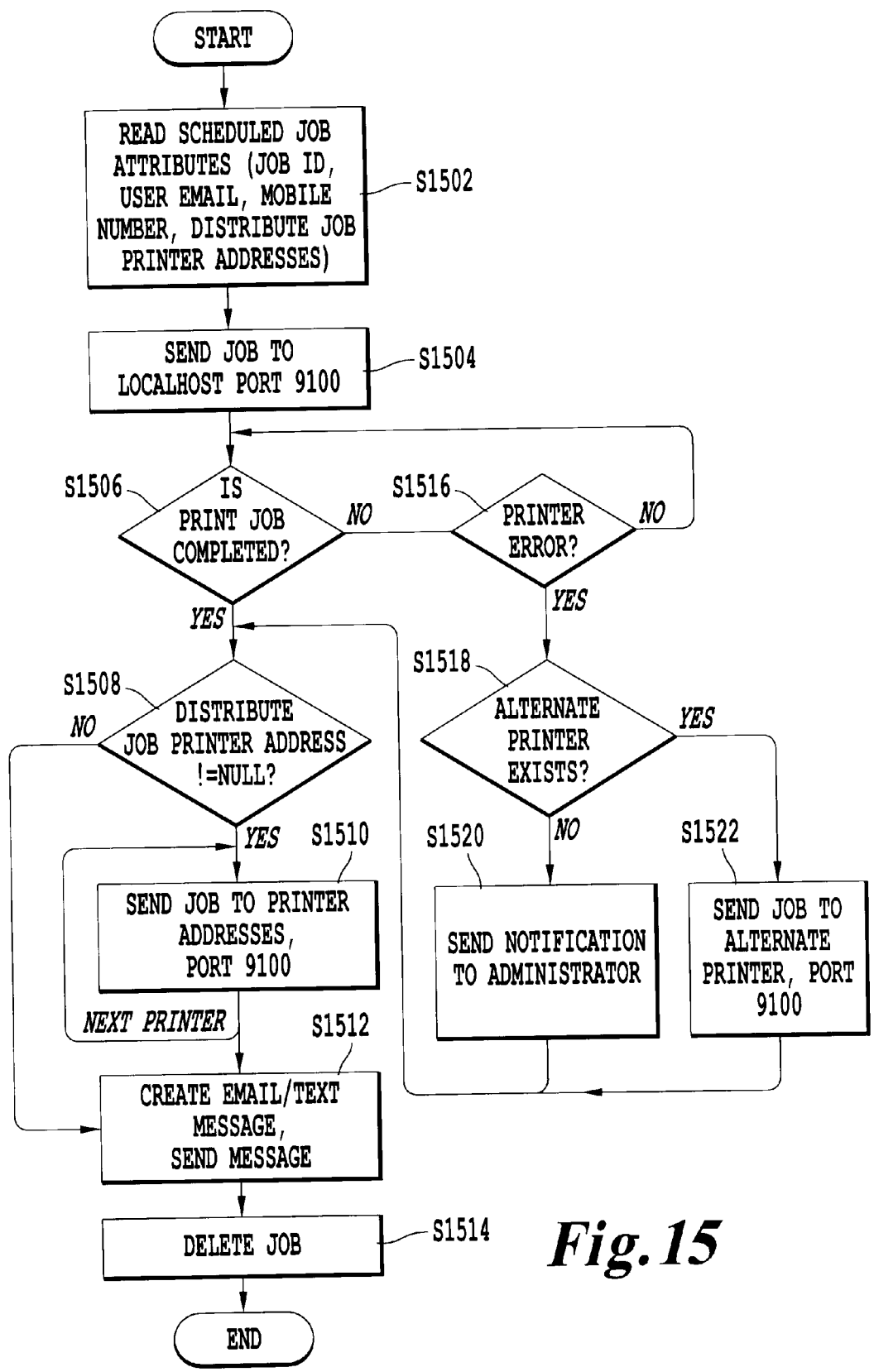
FIG. 15 illustrates an exemplary flow diagram for executing the scheduled print job.

FIG. 15 illustrates a process for executing the scheduled print job. For example, a job execution thread performs execution of the scheduled print job according to scheduled job attributes related to the scheduled print job. For example, in step S1402, the job execution thread reads the scheduled job attributes. The scheduled job attributes may include a Job ID which is used to fetch a scheduled print job from the storage 44; a user e-mail which is used by the notification module 48 to send an e-mail including status information; a mobile number which is used by the notification module 48 to send a text message including the status information; and distribute job printer addresses, if available, which are used by the scheduled print device 30 to forward the print job for printing by one or more printers identified by the distribute job printer addresses.

In step S1504, the scheduled print job is sent to local host port 9100 (e.g., DiPrint 9100 illustrated in FIG. 5D). In step S1506, the job execution thread determines whether the scheduled print job was completed successfully. If the scheduled print job is completed successfully, the job execution thread determines whether the scheduled print job is to be distributed to any other printing devices, in step S1508. For example, the job execution thread determines whether the scheduled job attributes include at least one printing device address or host name to which the scheduled print job should be distributed. If the scheduled job attributes is determined to include at least one printing device address or host name, the scheduled print job sent to port 9100 of each of the at least one printing devices, in step S1510. In step S1512, a e-mail and/or text message indicating whether the scheduled print job was printed successfully is created and sent. After creating and sending the e-mail and/or text message, the scheduled print job is deleted in step S1514.

On the other hand, if the print job is determined not to have been completed in step S1506, the job execution thread determines whether an error occurred while outputting the scheduled print job, in step S1516. If an error did not occur while outputting the scheduled print job, the job execution thread returns to step S1506, at which time the job execution thread again determines whether the print job has been completed. However, if an error is determined to have occurred in step S1516, the job execution thread determines whether an alternate printer for printing the scheduled print job exists, in step S1518. If an alternate printer does not exist, in step S1520, a notification may optionally be sent to an administrator or any other designated party. If an alternate printer does exist, the job execution thread is sent to port 9100 of the alternate printer. The process then proceeds to step S1508, as discussed above.

FIGS. 16A-16D illustrate exemplary interfaces used for scheduled print administration. Using the exemplary interfaces of FIGS. 16A-16D, an administrator can manage the scheduled print application 32 of the scheduled print device 30, through a Web interface. Using the Web interface, the administrator can access various features including (1) viewing scheduled print jobs, (2) setting a threshold of pages for immediate print, such that a print job is scheduled to print during off peak hours, (3) setting an off peak hours schedule, (4) set a list of one or more alternate printers if an error occurs while printing a scheduled print job, (5) viewing error logs, and (6) viewing scheduled job logs.

Figures 16A, 16B:
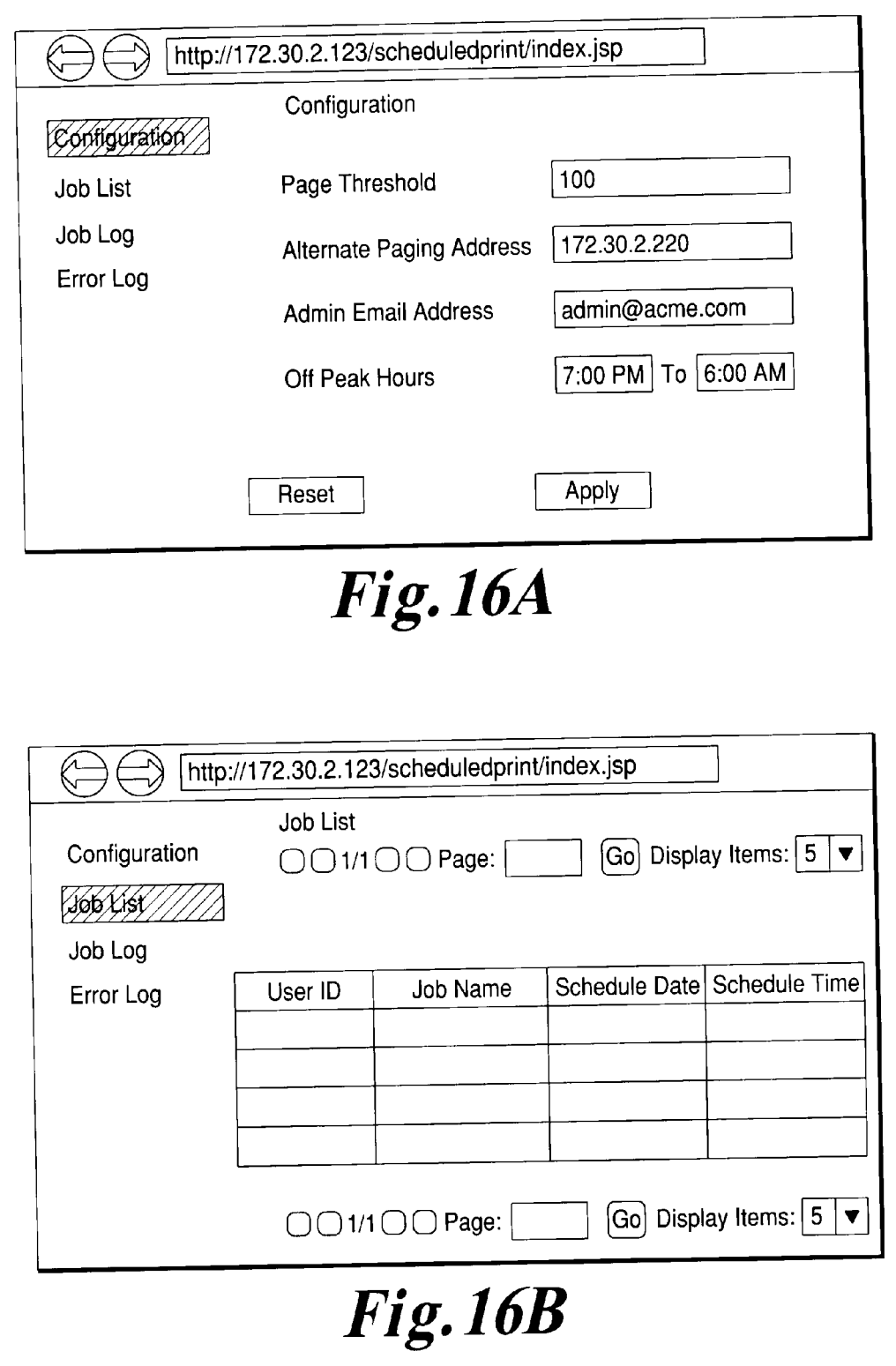

An exemplary Scheduled Print Configuration screen is illustrated in FIG. 16A. In FIG. 16A, the administrator may input the threshold of pages for immediate print (e.g., 100 pages). Further, the administrator may enter an alternate printer address (e.g., 172.30.2.220), administrator or other designated party e-mail address (e.g., admin@acme.com), and define off peak hours (e.g., 7:00 PM to 6:00 AM). However, it should be noted that the Scheduled Print Configuration screen is not so limited. For example, the page threshold may be defined by other information indicative of resources necessary for printing a scheduled print job such as an estimated print time, toner requirements, resolution requirements, etc. Further, the administrator may optionally define a plurality of alternate printer addresses, administrator or designated party e-mail addresses, or off peak hours. Alternatively, the off peak hours may be automatically determined based on printing history information or the like.

Figures 16C, 16D:
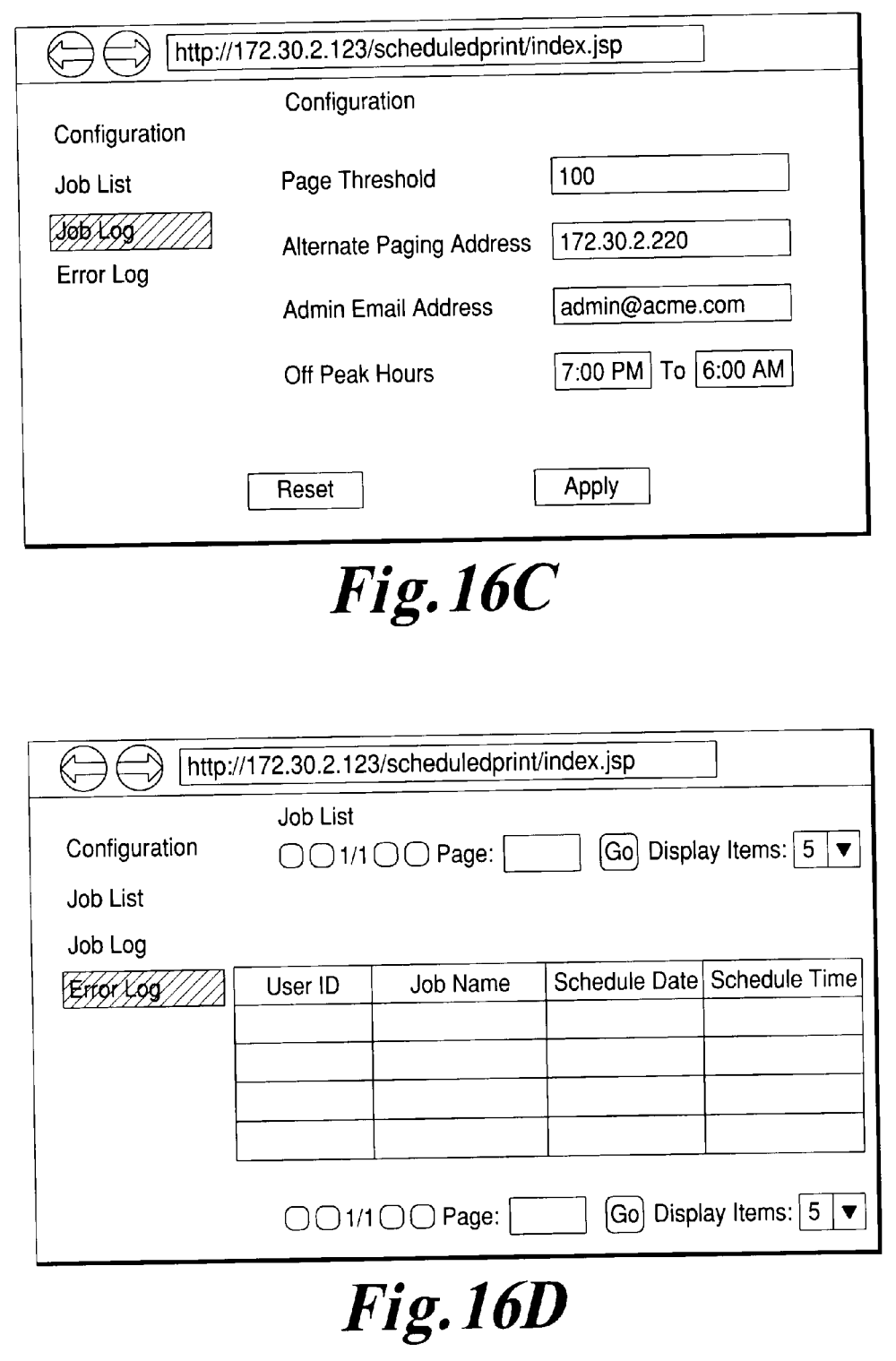

FIG. 16B illustrates an exemplary Scheduled Print Job List screen, which displays a list of scheduled print jobs. FIG. 16C illustrates an exemplary Scheduled Print Job Log screen, which displays a list of executed scheduled print jobs. Further, FIG. 16D illustrates an exemplary Scheduled Print Error Log screen, which displays a list of any errors that occurred during execution of the scheduled print jobs.

Figure 17:
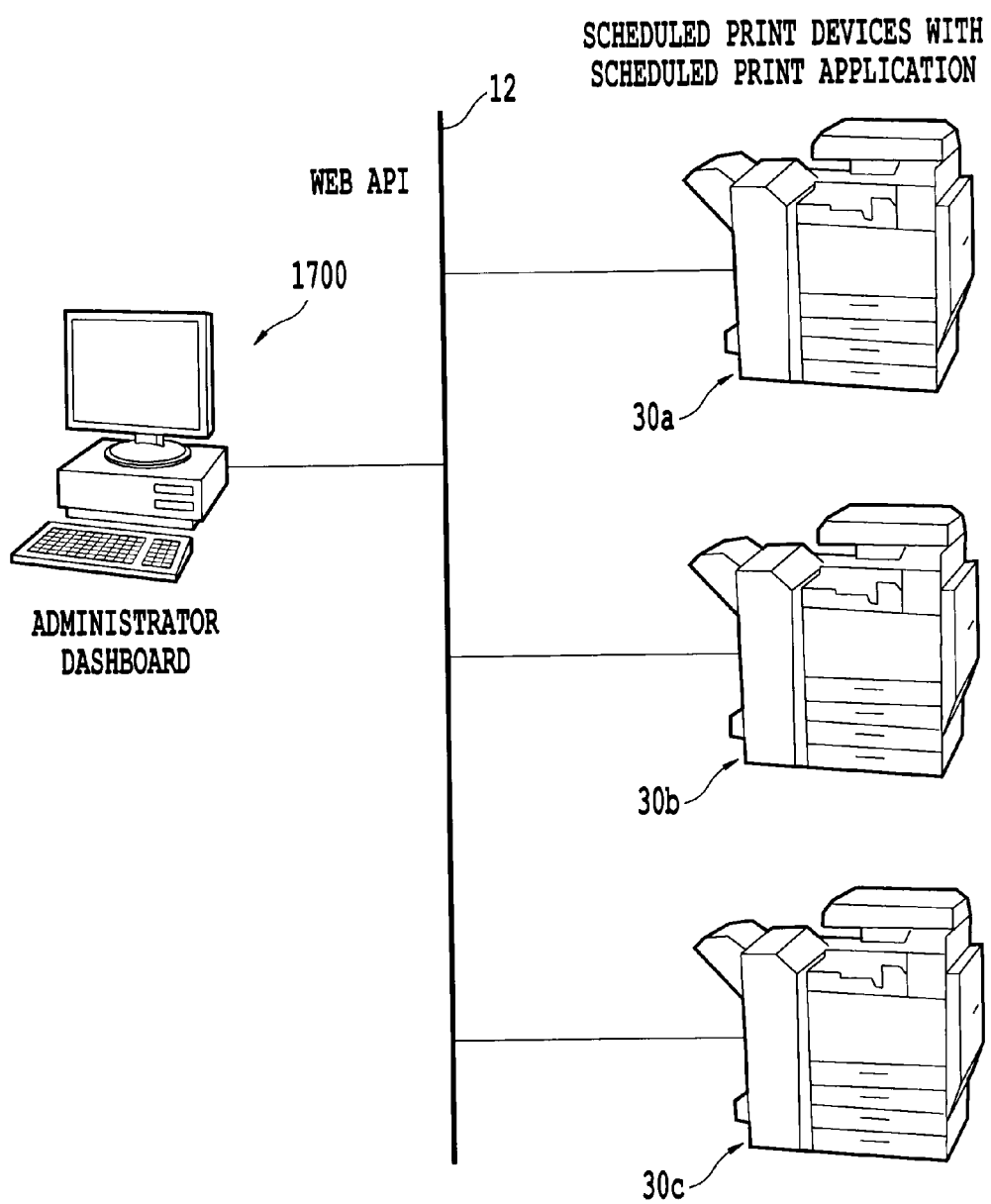
FIG. 17 illustrates an exemplary system in which an Administrator Dashboard collects data from a plurality of scheduled print devices.

FIG. 17 illustrates an exemplary system in which an Administrator Dashboard 1700 is connected to a plurality of scheduled print devices 30a-30c over a network, such as the network 12 discussed above. Each of the scheduled print devices 30a-30c include a scheduled print application 32 that provides web service APIs for a web client application (e.g., the Administrator Dashboard) to collect information about the scheduled print jobs of the respective scheduled print devices 30A-30C. The purpose of the web service API is to expose scheduled print related data such as scheduled print job information. The web service APIs can be accessed via the Internet (e.g., using HTTP or HTTPS) in the form of GET or POST methods. With these APIs, the client side application can be developed to consolidate data from the plurality of scheduled print devices 30a-30c to gather scheduled print related data.

For example, the web service API can be accessed via the Internet using a uniform resource locator (URL) such as http://<IPAddress>/scheduledprint/webapi Where <IPAddress> is the IP address or name of the scheduled print device 30 on which the scheduled print related data is requested.

In one embodiment, the web service API accepts the following parameters: (1) command and (2) clientid, which are mandatory parameters. For example, the Administrator Dashboard 1700 may access scheduled job information of a scheduled print device 30 using the following request:

```
http://<IPAddress>/scheduledprint/webapi?command=scheduledjobs
    &clientid=askeelrrogkklsllakfkl34d
```

In an exemplary embodiment, the command "scheduledjobs" corresponds to a request to return scheduled print job information as XML. The "clientid", which is also known as an API Key, is used to validate a client's access to the web service API. Generally the Client ID (API Key) is distributed to an application developer who wants to develop an application using the web service API.

In response to a web service API request, the web service API of the scheduled print device 30 processes the request and returns a web service API response. FIG. 18 illustrates an exemplary generic XML message, included in the web service API response, that is returned to the Administrator Dashboard 1700 when the command submitted with the web service API request is invalid. FIG. 19 illustrates additional exemplary response codes and their corresponding descriptions.

In FIG. 18, the <command/> is a generic example, and depends on the actual command requested. In one example, if the command is "scheduledjobs", then the response illustrated in FIG. 18 would be modified as follows:

```
<ScheduledPrintApiResponse>
    <command>scheduledjobs</command>
    <responseCode>0</responseCode>
    <message>Success</message>
    <commandResponse />
</ScheduledPrintApiResponse>
```

In the above exemplary response, the <commandResponse/> is a generic example. An example of the actual information included in the exemplary web service API response for the command "scheduledjobs" is illustrated in FIG. 20.

Numerous modifications and variations of the present invention are possible in light of the above teachings. It is therefore to be understood that within the scope of the appended claims, the invention may be practiced otherwise than as specifically described herein.

The invention claimed is:

1. A method for outputting a scheduled print job by a printing device connected to a client device over a network, comprising:
   generating, by the client device, the scheduled print job including print data and PJL commands/comments, the PJL commands/comments defining a predetermined destination, to which a message is to be sent, and a scheduled time the print data is to be printed, the predetermined destination being different from a destination of the client device identified to print the scheduled print job;

transmitting, by the client device, a request to print the scheduled print job;

receiving, by the printing device, the request to print the scheduled print job from the client device;

storing, in a memory of the printing device, the scheduled print job;

executing, by the printing device, the scheduled print job at the scheduled time;

determining, by the printing device, whether the scheduled print job was outputted successfully by the printing device at the scheduled time; and sending, by the printing device, the message indicating whether the scheduled print job was outputted successfully by the printing device at the scheduled time, based on the determining step, to the predetermined destination.

2. The method of claim 1, further comprising:
receiving, by the printing device, a request to immediately print, modify, or delete the scheduled print job stored in the printing device.

3. The method of claim 1, further comprising:
receiving, by the printing device, a parameter defining a threshold for determining whether a scheduled print job should be rescheduled for output during off peak hours.

4. The method of claim 1, further comprising:
transferring, by the printing device, the scheduled print job to another printing device when the scheduled print job cannot be completed at the scheduled time by the printing device.

5. The method of claim 1, further comprising:
sending, by the printing device, the scheduled print job to at least one other printing device designated in the scheduled print job.

6. The method of claim 1, further comprising:
sending, by the printing device, status information to an administrator device connected to the printing device over the network, the administrator device being configured to receive status information from a plurality of printing devices.

7. A method of a printing device for outputting a scheduled print job, comprising:
receiving, by the printing device, a request to print the scheduled print job from a client device, the scheduled print job including print data and PJL commands/comments, the PJL commands/comments defining a predetermined destination, to which a message is to be sent, and a scheduled time the print data is to be printed, the predetermined destination being different from a destination of the client device identified to print the scheduled print job;

storing, in a memory of the printing device, the scheduled print job;

executing, by the printing device, the scheduled print job at the scheduled time;

determining, by the printing device, whether the scheduled print job was outputted successfully by the printing device at the scheduled time; and sending, by the printing device, the message indicating whether the scheduled print job was outputted successfully by the printing device at the scheduled time, based on the determining step, to the predetermined destination.

8. The method of claim 7, further comprising:
receiving, by the printing device, a request to immediately print, modify, or delete the scheduled print job stored in the printing device.

9. The method of claim 7, further comprising:
receiving, by the printing device, a parameter defining a threshold for determining whether a scheduled print job should be rescheduled for output during off peak hours.

10. The method of claim 7, further comprising:
transferring, by the printing device, the scheduled print job to another printing device when the scheduled print job cannot be completed at the scheduled time by the printing device.

11. The method of claim 7, further comprising:
sending, by the printing device, the scheduled print job to at least one other printing device designated in the scheduled print job.

12. The method of claim 7, further comprising:
sending, by the printing device, status information to an administrator device connected to the printing device over the network, the administrator device being configured to receive status information from a plurality of printing devices.

13. A printing device, comprising:
means for receiving a request to print a scheduled print job from a client device, the scheduled print job including print data and PJL commands/comments, the PJL commands/comments defining a predetermined destination, to which a message is to be sent, and a scheduled time the print data is to be printed, the predetermined destination being different from a destination of the client device identified to print the scheduled print job;

a memory configured to store the scheduled print job;

means for executing the scheduled print job at the scheduled time;

means for determining whether the scheduled print job was outputted successfully by the printing device at the scheduled time; and means for sending the message indicating whether the scheduled print job was outputted successfully by the printing device at the scheduled time, based on the determination by the means for determining, to the predetermined destination.

14. The printing device of claim 13, further comprising:
means for receiving a request to immediately print, modify, or delete the scheduled print job stored in the printing device.

15. The printing device of claim 13, further comprising:
means for receiving a parameter defining a threshold for determining whether a scheduled print job should be rescheduled for output during off peak hours.

16. The printing device of claim 13, further comprising:
means for transferring the scheduled print job to another printing device when the scheduled print job cannot be completed at the scheduled time by the printing device.

17. The printing device of claim 13, further comprising:
means for sending the scheduled print job to at least one other printing device designated in the scheduled print job.

18. The printing device of claim 13, further comprising:
means for sending status information to an administrator device connected to the printing device over the network, the administrator device being configured to receive status information from a plurality of printing devices.

19. The method of claim 1, wherein the sending step comprises:
sending a message indicating that the scheduled print job was not outputted successfully by the printing device at the scheduled time.

\* \* \* \* \*